(12) United States Patent
Schoonover

(10) Patent No.: US 10,723,210 B2
(45) Date of Patent: Jul. 28, 2020

(54) SEALS AND METHOD FOR MAKING SAME

(71) Applicant: Vintech Industries, Inc., Imlay City, MI (US)

(72) Inventor: James Schoonover, Shelby Township, MI (US)

(73) Assignee: Vintech Industries, Inc., Imlay City, MI (US)

( * ) Notice: Subject to any disclaimer, the term of this patent is extended or adjusted under 35 U.S.C. 154(b) by 278 days.

(21) Appl. No.: 15/599,141

(22) Filed: May 18, 2017

(65) Prior Publication Data

US 2017/0334277 A1    Nov. 23, 2017

Related U.S. Application Data

(60) Provisional application No. 62/377,320, filed on Aug. 19, 2016, provisional application No. 62/337,969, filed on May 18, 2016.

(51) Int. Cl.
*F16J 15/02* (2006.01)
*B60J 10/17* (2016.01)
(Continued)

(52) U.S. Cl.
CPC ........... *B60J 10/17* (2016.02); *B29C 33/0077* (2013.01); *B29C 33/10* (2013.01); *B29C 48/11* (2019.02); *B29C 48/146* (2019.02); *B29C 48/2566* (2019.02); *B29C 48/25686* (2019.02); *B29C 48/30* (2019.02); *B29C 48/3001* (2019.02); *B29C 48/302* (2019.02); *B60J 10/15* (2016.02); *B60J 10/80* (2016.02); *F16J 15/02* (2013.01); *B29L 2031/302* (2013.01);
(Continued)

(58) Field of Classification Search
CPC .... E06B 7/2309; E06B 7/2314; E06B 7/2316; E06B 7/22–23; F16J 15/02; F16J 15/46
See application file for complete search history.

(56) References Cited

U.S. PATENT DOCUMENTS 2,137,887 A   11/1938 Abbott
2,259,940 A * 10/1941 Nathan ................. F16L 17/035
                                                    277/626
(Continued)

FOREIGN PATENT DOCUMENTS

JP    2013107607 A   6/2013
JP    2015214037 A   12/2015

*Primary Examiner* — Vishal A Patel
(74) *Attorney, Agent, or Firm* — Warn Partners, P.C.

(57) ABSTRACT

Extruded seals including a sealing portion with a honeycomb profile and method for making extruded seals with honeycomb profiles. An extrusion tool is provided with a first and second plate connected together. The first plate has a plurality of pins, which are vented to form a honeycomb profile. The second plate has a profiled opening receiving the plurality of pins and forming the overall shape of the part, including the outermost surfaces of the part. The pins serve as mandrels for extruded molten material to flow around. Varying the pin configuration and dimensions changes the honeycomb profile. The honeycomb structure is provided in the sealing portion of the extrusion. The honeycomb profile is formed by itself, co-extruded with a rigid or semi-rigid structural member, or applied to the rigid or semi-rigid structural member after the structural member is formed.

22 Claims, 16 Drawing Sheets

(51) Int. Cl.
*B60J 10/80* (2016.01)
*B60J 10/15* (2016.01)
*B29C 48/14* (2019.01)
*B29C 48/25* (2019.01)
*B29C 48/30* (2019.01)
*B29C 48/11* (2019.01)
*B29C 33/00* (2006.01)
*B29C 33/10* (2006.01)
*B29L 31/30* (2006.01)
*B32B 38/00* (2006.01)

(52) U.S. Cl.
CPC ... *B32B 2038/0076* (2013.01); *B32B 2323/04* (2013.01); *B32B 2581/00* (2013.01)

(56) References Cited

U.S. PATENT DOCUMENTS

| | | | | |
|---|---|---|---|---|
| 2,908,949 A * | 10/1959 | Frehse | ............... | F25D 23/087 |
| | | | | 138/111 |
| 3,647,229 A * | 3/1972 | Grimes | ............... | F16J 15/027 |
| | | | | 277/615 |
| 3,831,950 A * | 8/1974 | Bentley | ............... | F16J 15/3236 |
| | | | | 277/649 |
| 4,508,355 A * | 4/1985 | Ditcher | ............... | E03F 3/04 |
| | | | | 277/605 |
| 4,807,397 A * | 2/1989 | Doan | ............... | E06B 7/2309 |
| | | | | 49/383 |
| 4,900,607 A * | 2/1990 | Glang | ............... | E21D 11/385 |
| | | | | 277/626 |
| 5,888,023 A * | 3/1999 | Grabe | ............... | E21D 11/385 |
| | | | | 277/626 |
| 5,997,006 A * | 12/1999 | Westhoff | ............... | F16L 5/02 |
| | | | | 277/604 |
| 6,129,485 A * | 10/2000 | Grabe | ............... | E21D 11/385 |
| | | | | 277/626 |
| 6,238,139 B1 * | 5/2001 | Glang | ............... | E21D 11/385 |
| | | | | 405/135 |
| 6,458,301 B1 | 10/2002 | Hendrix | | |
| 6,592,296 B2 * | 7/2003 | Gutschmidt | ............... | E21D 11/385 |
| | | | | 277/628 |
| 9,321,209 B2 | 4/2016 | Schoonover et al. | | |
| 9,556,734 B2 * | 1/2017 | Carr | ............... | E21D 11/385 |
| 2012/0038117 A1 | 2/2012 | Knapp | | |
| 2012/0260579 A1 * | 10/2012 | DeMello | ............... | E06B 7/2309 |
| | | | | 49/477.1 |
| 2016/0046056 A1 | 2/2016 | Schoonover et al. | | |

* cited by examiner

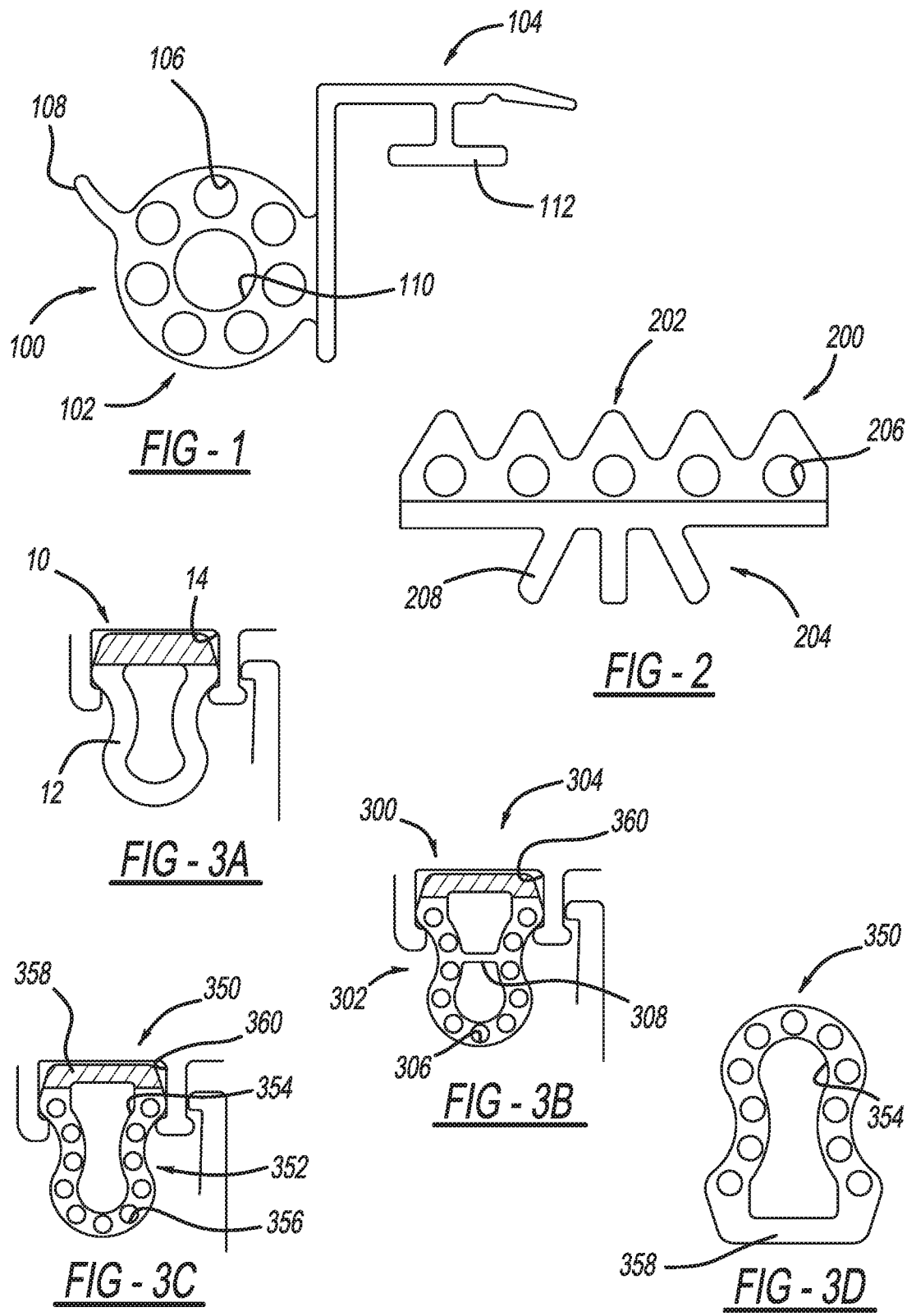

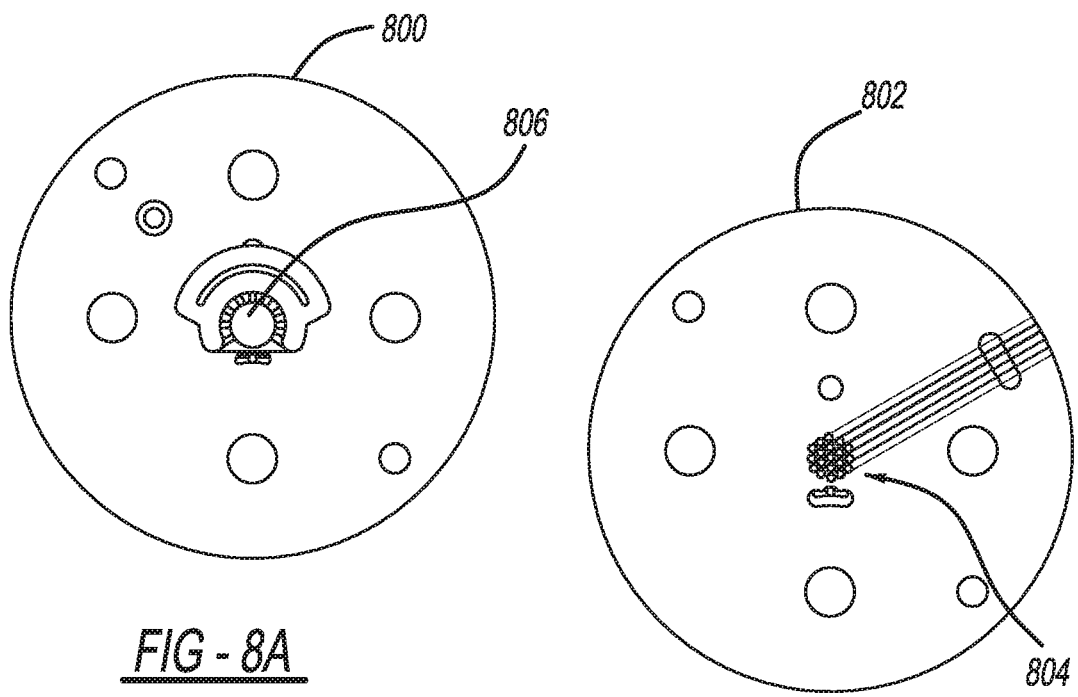
FIG - 8A
FIG - 8B
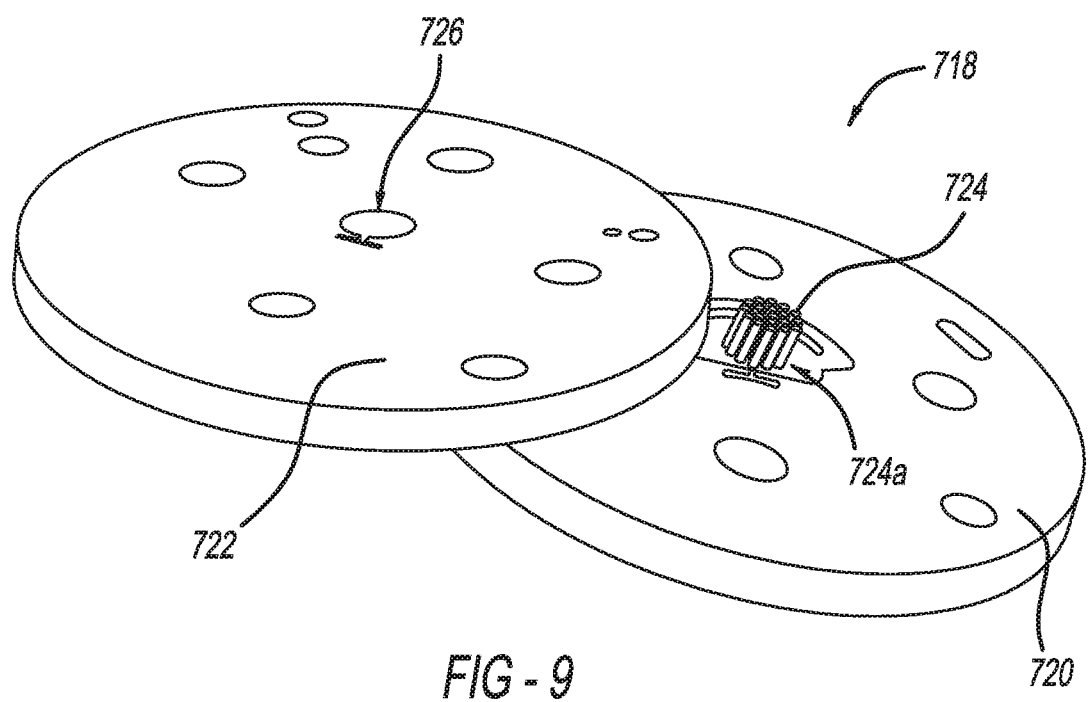
FIG - 9

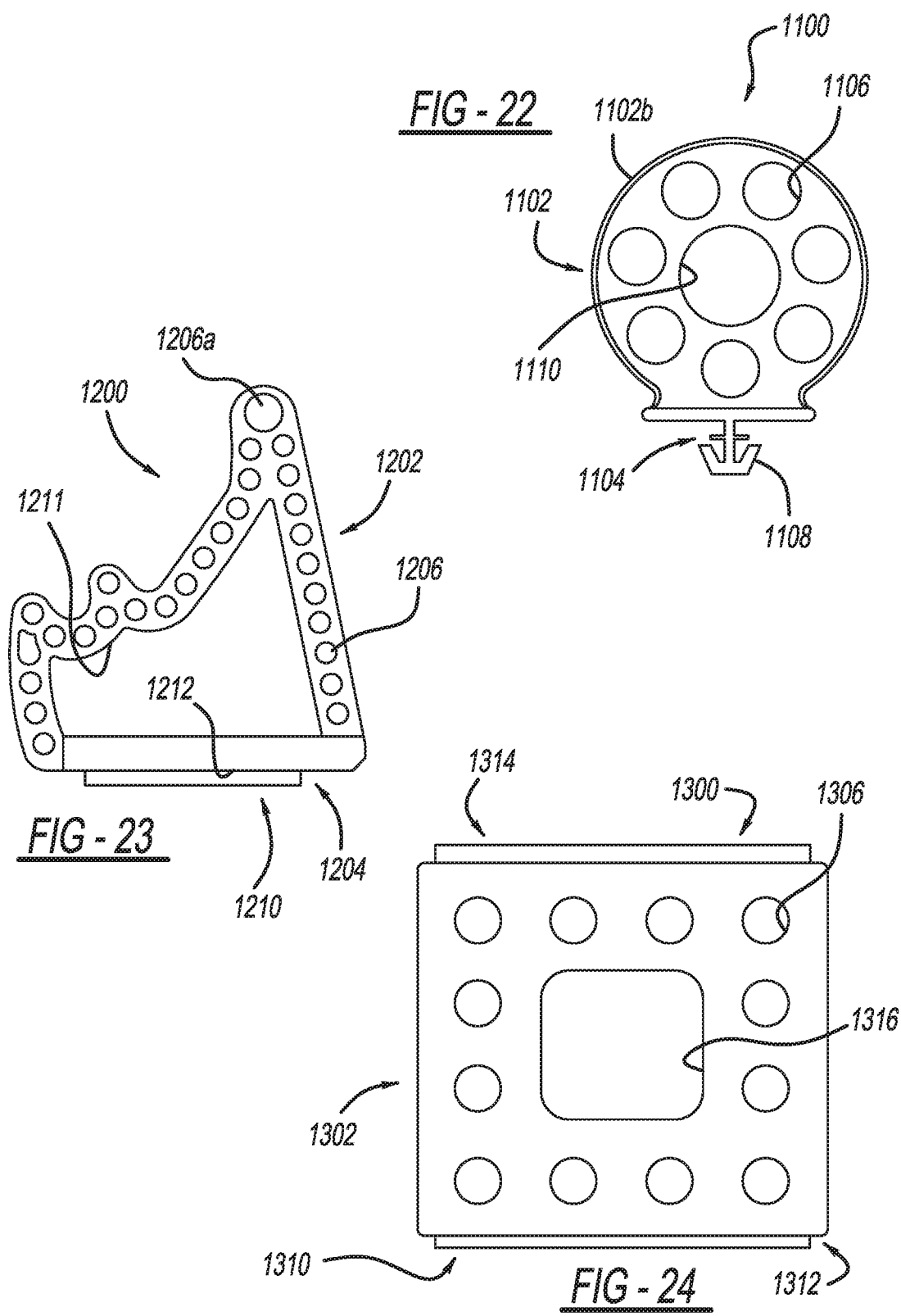

SEALS AND METHOD FOR MAKING SAME

CROSS-REFERENCE TO RELATED APPLICATIONS

This application claims the benefit of U.S. Provisional Application No. 62/337,969, filed May 18, 2016 and U.S. Provisional Application No. 62/377,320 filed Aug. 19, 2016. The disclosures of the above applications are incorporated herein by reference.

FIELD OF THE INVENTION

The present invention relates to seals and trim and a method for making extruded seals and trims for attachment to motor vehicle components.

BACKGROUND OF THE INVENTION

Gaskets, seals, e.g., resilient bulb seals and lip type seals, and trims are generally known and are commonly used for vehicle window, trunk, door and other component sealing. Seals and trims are often placed along the sealing edge of components and along the interface of abutting surfaces of parts to prevent water, debris, and air drafts from entering the interior of the vehicle. Common seals include at least two sub-parts; a sealing portion, e.g., bulb portion, and a structural member for attachment to the vehicle, which structural member generally has a greater stiffness and higher durometer for installation. Seals are conventionally made by a co-extrusion process where the mounting portion and sealing portion are co-extruded.

Typical gaskets and seals for doors and windows are manufactured with thermoplastic vulcanizates (TPV) or EPDM (ethylene propylene diene monomer) material. Commonly known seals have a solid cross section, that is, without honeycomb or other internal structure. Other seals are foamed or otherwise opened cell structured. These generally have a lower tear strength, non uniform density, and are known to absorb moisture.

Therefore, it is desirable to have a seal and method for making same, which has a closed cell structure and honeycomb profile that provides a higher tear strength, more uniform density and repeatability and which does not absorb moisture, and without compromising the mounting and sealing characteristics.

SUMMARY OF THE INVENTION

The present invention is generally directed to extruded seals, e.g., extruded automotive seals, and a method for making seals usable for attachment to components for final assembly in vehicles. There is provided at least one extrusion tool assembly having at least two plates connected together and operably mounted to an extruder. A first plate is operably provided with a series of holes in a predetermined configuration depending on the particular application. Typically, a plurality of pins are provided which serve as mandrels for molten material, e.g., TPV, to flow around the pins. A second plate is provided operable to form the outermost shape of the part. Typically, the second plate has a profiled opening for forming the outermost shape depending on the particular application, wherein the plurality of pins, which are vented, fit within this profiled opening in a predetermined configuration.

The extruded seals have a honeycomb-like extrusion part profile, most preferably, honeycombed-like structure substantially throughout a sealing portion of the extruded seal. There are various pin layouts and configurations for forming different seal shapes and honeycomb profiles, and various profiled opening shapes and sizes for forming the desired outermost shapes. In one embodiment, the extruded seals are also provided with a rigid or semi-rigid structure (or "structural member" or "carrier member") for mounting to a vehicle, most preferably, of a higher durometer than the sealing portion. The honeycomb profile is formed as itself (alone), co-extruded with the structural member, or applied to the structural member after the structural member is formed.

Preferably, the method is performed with in-line processing steps, upstream to downstream, arranged generally along the longitudinal axis with pulled material moving in a forward direction toward a cutting device that cuts the extrusion to predetermined length.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a front elevation view of an extruded seal, according to an embodiment of the present invention;

FIG. 2 is a front elevation view of an extruded seal, according to another embodiment of the present invention;

FIG. 3A is a front elevation view of a conventional seal;

FIG. 3B is a front elevation view of an extruded seal in an exemplary environment of use, according to another embodiment of the present invention;

FIG. 3C is a front elevation view of an extruded seal, according to another embodiment of the present invention;

FIG. 3D is a front elevation view of the extruded seal of FIG. 3C;

FIGS. 8A-8B are top plan views of a first plate and second plate of an extrusion tool assembly for manufacturing extruded seals, in accordance with another embodiment of the present invention;

FIG. 9 is a perspective view of FIGS. 8A-8B;

FIG. 22 is a front elevation view of an extruded seal, according to another embodiment of the present invention;

FIG. 23 is a front elevation view of an extruded seal, according to an embodiment of the present invention;

FIG. 24 is a front elevation view of an extruded seal, according to another embodiment of the present invention;

DETAILED DESCRIPTION OF THE PREFERRED EMBODIMENTS

Figure 4:
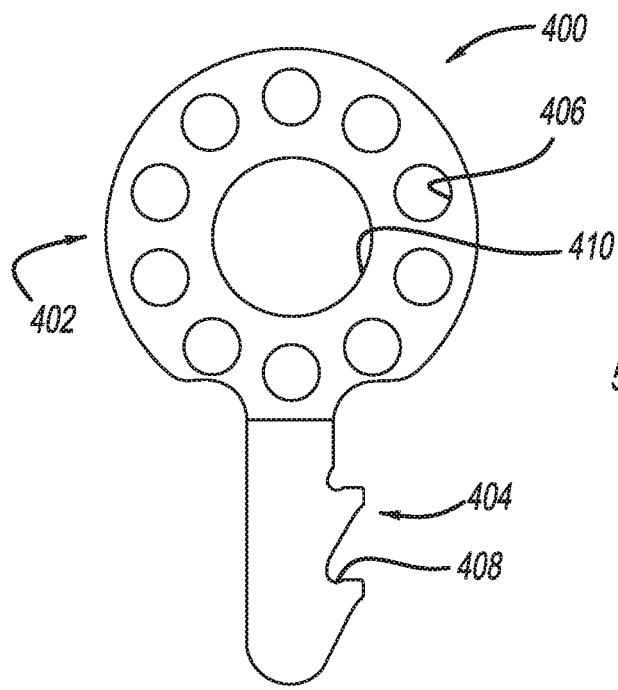
FIG. 4 is a front elevation view of an extruded seal, according to another embodiment of the present invention.

The following description of the preferred embodiment(s) is merely exemplary in nature and is in no way intended to limit the invention, its application, or uses.

Referring to the figures generally, in accordance with the present invention there is provided an extruded seal with a honeycomb like internal profile and tooling and method of manufacturing same. FIGS. 1-2, 3B-7, 21-25 and 32 illustrate exemplary embodiments of extruded seals, according to the present invention, having honeycomb profiles. Most preferably, the honeycomb profile is a predetermined configuration of a plurality of apertures (or "honeycomb apertures") formed in at least a sealing portion of the seal. The honeycomb profile allows a good seal between two or more objects and with significant advantages over traditional seals, such as not holding moisture, being more robust and durable and lower compression set.

It is understood that the terms "honeycomb" or "honeycomb structure" are not intended to be limiting to only hexagon shapes or hexagonal prismatic honeycomb.

While the apertures are illustrated as generally circular cross section, it is understood that any alternative shape depending on the application is contemplated without departure from the scope of the present invention, e.g., square, hexagon, etc. It is further understood that the extruded seals are formed or cut to a predetermined length, e.g., continuous extrusion cut to length, and that the apertures of the honeycomb structure are elongated interior voids extending the length of the extruded seal. Alternative shapes and geometries are contemplated depending on the application without departure from the scope of the present invention. The apertures are at least provided on at least one sealing portion. In addition, while the apertures are illustrated as generally uniformly sized, it is understood that, alternatively, larger or smaller sized or multiple sized holes in the same seal can be used depending on the application without departure from the scope of the present invention. It is further understood that the distance between adjacent apertures can be more or less than depicted depending on the application without departure from the scope of the present invention.

There are several benefits to the honeycomb extrusion part profile in accordance with the present invention over that of conventional parts, e.g., the present invention is a closed cell structure (not foamed), has higher tear strength, will not absorb moisture (e.g., that can wick or otherwise transfer to the interior of the vehicle), is more uniform in density and has more repeatability. The seal 10 is illustrated attached to a structure 14, such as a channel formed in an automobile.

FIG. 1 illustrates an extruded seal shown generally at 100, according to an embodiment of the present invention, that includes a bulb seal. At least one sealing portion shown generally at 102 and at least one structural member shown generally at 104 is provided. The sealing portion 102 has a plurality of apertures 106 forming a honeycomb configuration, e.g., substantially aligned circularly. The structural member 104 has no apertures 106. At least one flange 108 is also provided to provide another sealing surface for further sealing engagement against an object to be sealed. The structural member 104 is suitable for attachment to predetermined component(s) of a vehicle. In a preferred embodiment, a central opening 110 is provided in the sealing portion 102. The structural member 104 includes a T-shaped retainer 112, e.g., for sliding into a corresponding opening to affix the seal 100 to the vehicle. Alternative cross sections besides T-shaped are contemplated depending on the application without departing from the scope of the present invention.

Typically, the extruded seal 100 is formed of at least two materials. Preferably, one material is a polypropylene. Preferably, the other material is a thermoplastic vulcanizate (TPV). Both materials have a predetermined durometer. The TPV is generally 20-60 Shore A durometer ("A") typically, 30-50 A, preferably, 30-40 A, most preferably, 35 A. Any other suitable materials and durometers are contemplated depending on the particular application without departing from the scope of the present invention.

FIG. 2 illustrates an extruded seal shown generally at 200, according to an embodiment of the present invention, that is a glazing seal. At least one sealing portion shown generally at 202 and at least one structural member shown generally at 204 is provided. The sealing portion 202 has a plurality of apertures 206 forming the honeycomb structure, e.g., substantially aligned parallel on the same plane. The structural member 204 has no apertures 206. The structural member 204 has at least one barb 208, preferably a plurality of barbs. The structural member 204 is suitable for attachment to predetermined component(s) of a vehicle. Preferably, a slipcoat is provided on at least the sealing portion 202.

Typically, the extruded seal 200 is formed of at least two materials. Preferably, one material is a polypropylene. Preferably, the other material is a TPV. The TPV is generally 30-60 Shore A durometer (A) typically, 40-50 A, preferably, 43-48 A, most preferably, 45 A. Any other suitable materials and durometers are contemplated depending on the particular application without departing from the scope of the present invention.

FIG. 3A illustrates an example of a known seal shown generally at 10, which has a solid sealing portion 12 with no honeycomb structure.

FIG. 3B illustrates an extruded seal shown generally at 300, according to an embodiment of the present invention. At least one sealing portion shown generally at 302 and at least one structural member shown generally at 304 is provided. The sealing portion 302 has a plurality of apertures 306 forming a honeycomb configuration. A strengthening strip 308 or web is provided. The structural member 304 has no apertures 308. The structural member 304 is suitable for attachment to predetermined components of a vehicle. In accordance with a preferred embodiment, the base of the extruded seal 300 fits within a channel of predetermined component(s) of a vehicle.

FIGS. 3C and 3D illustrate an extruded seal shown generally at 350, according to an embodiment of the present invention, which is similar to the extruded seal 300, but the sealing portion 352 has no strengthening strip 308. The sealing portion 352 has a plurality of apertures 356 forming a honeycomb configuration. At least one structural member 358 is provided and has no apertures 356. In a preferred embodiment, the extruded seal 350 has a central or middle area open space 354 along the longitudinal length of the extruded seal 350.

The seals 300,350 are illustrated attached to an exemplary structure 360, but other attachment structures are contemplated. The seals 300,350 seal or close out multiple objects such as rigid objects.

FIG. 4 illustrates an extruded seal shown generally at 400, according to an embodiment of the present invention, that is a bulb seal. At least one sealing portion shown generally at 402 and at least one structural member shown generally at 404 is provided. The sealing portion 402 has a plurality of apertures 406 forming a honeycomb configuration, e.g., substantially circular pattern. The structural member 404 has no apertures 406. Preferably, a central opening 410 is provided in the sealing portion 402. The structural member 404 is suitable for attachment to predetermined component(s) of a vehicle. At least one barb 408, preferably a plurality of barbs 408, is also provided on the at least the structural member 404 for attachment to opposing features of the vehicle component.

The sealing portion 402 material and structural member 404 material is preferably thermoplastic vulcanizate (TPV), most preferably, having different durometers. Any other suitable materials and durometers are contemplated depending on the particular application without departing from the scope of the present invention.

Figure 5:
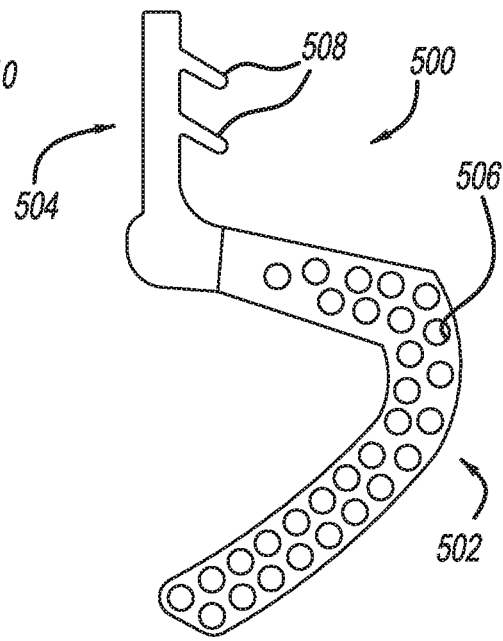
FIG. 5 is a front elevation view of an extruded seal, according to another embodiment of the present invention.

FIG. 5 illustrates an extruded seal shown generally at 500, according to an embodiment of the present invention, that is a door seal. At least one sealing portion shown generally at 502 and at least one structural member shown generally at 504 is provided. The sealing portion 502 has a plurality of apertures 506 forming a honeycomb configuration, e.g., substantially aligned in at least two lines curved and/or straight. The structural member 504 has no apertures 506. The structural member 504 is suitable for attachment to predetermined component(s) of a vehicle. At least one barb 508, preferably a plurality of barbs 508, is also provided on the at least the structural member 504 for attachment to opposing features of the component.

The sealing portion 502 material is generally 50-90 Shore A durometer (A) thermoplastic (TPV), typically, 60-80 A TPV, preferably, 60-70 A TPV, most preferably, 67 A TPV. The structural member 504 is generally at least 40 Shore D ("D") TPV, typically, 40-60 D TPV, preferably, 45-55 D TPV, most preferably 50 D TPV. Any other suitable materials and durometers are contemplated depending on the particular application without departing from the scope of the present invention.

Figure 6:
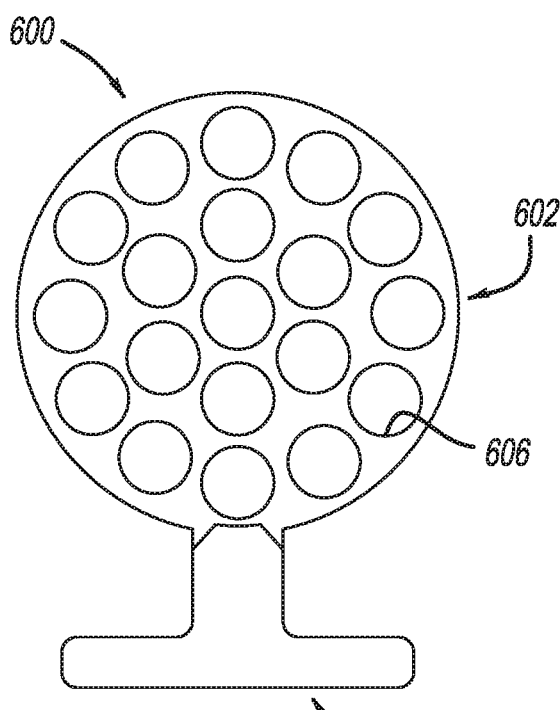
FIG. 6 is a front elevation view of an extruded seal, according to another embodiment of the present invention.

FIG. 6 illustrates an extruded seal shown generally at 600, according to an embodiment of the present invention, that is a bulb seal. At least one sealing portion shown generally at 602 and at least one structural member shown generally at 604 is provided. The sealing portion 602 has a plurality of apertures 606 forming a honeycomb configuration. The structural member 604 has no apertures 606. The structural member 604 is suitable for attachment to predetermined component(s) of a vehicle. In a preferred embodiment, the sealing portion 602 has no central opening (e.g., unlike FIGS. 1 and 4). The structural member 604 includes a T-shaped retainer profile, e.g., for sliding into a corresponding opening to affix the seal the vehicle, but alternative shapes are contemplated depending on the application without departing from the scope of the present invention.

The sealing portion 602 material is preferably polypropylene. The structural member 604 is preferably thermoplastic vulcanizate (TPV). Any other suitable materials are contemplated depending on the particular application without departing from the scope of the present invention.

Figure 7:
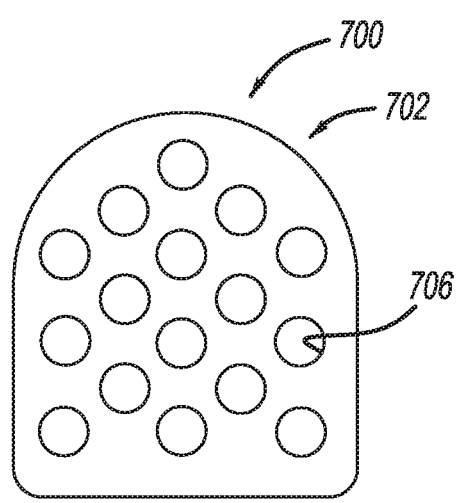
FIG. 7 is a front elevation view of an extruded seal, according to another embodiment of the present invention.
Figure 10:
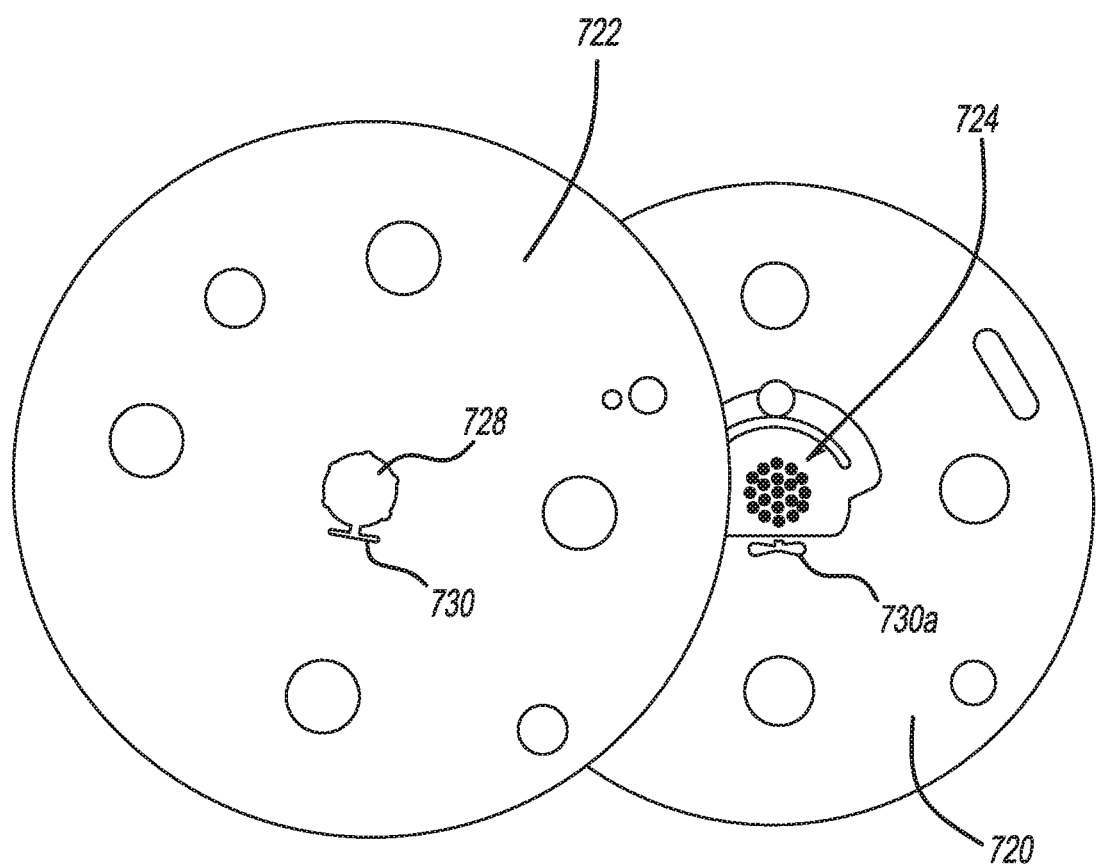
FIG. 10 is an enlarged top plan view of FIGS. 8A-8B.

FIG. 7 illustrates an extruded seal shown generally at 700, according to an embodiment of the present invention, that is a micro hole bulb. At least one sealing portion shown generally at 702 is provided. The sealing portion 702 has a plurality of apertures 706 forming a honeycomb configuration. In a preferred embodiment, there is no structural member portion with no apertures 706. In a preferred embodiment, the sealing portion 702 has no central opening. In another embodiment, the sealing portion 702 is also contoured in a way suitable to create ridges or other curved features to retain within a corresponding channel of the vehicle component.

The sealing portion 702 material is preferably TPV. The sealing portion 702 material is generally 35-95 Shore A durometer (A) TPV typically, 50-80 A TPV, preferably, 60-70 A TPV, most preferably, 64 A TPV. Any other suitable materials and durometers are contemplated depending on the particular application without departing from the scope of the present invention.

Figure 21:
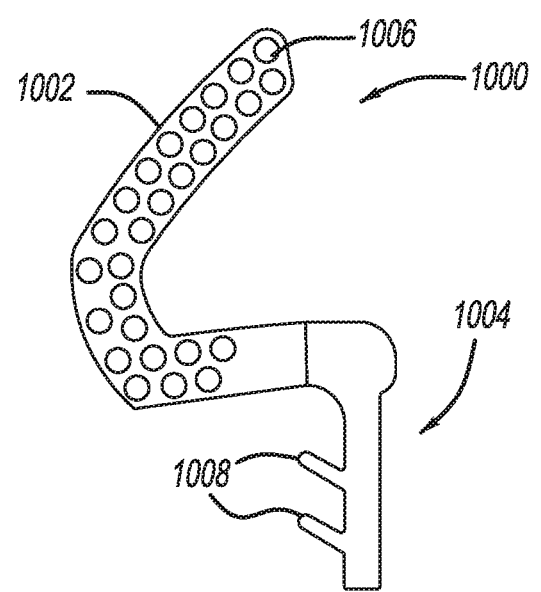
FIG. 21 is a front elevation view of an extruded seal, according to an embodiment of the present invention.

FIG. 21 illustrates an extruded seal shown generally at 1000, according to an embodiment of the present invention, that is a door seal. At least one sealing portion shown generally at 1002 and at least one structural member shown generally at 1004 is provided. The sealing portion 1002 has a plurality of apertures 1006 forming a honeycomb configuration, e.g., generally forming at least two lines of apertures. The structural member 1004 has no apertures 1006. The structural member 1004 is suitable for attachment to predetermined component(s) of a vehicle. At least one barb 1008, preferably a plurality of barbs 1008, is also provided on the at least the structural member 1004 for attachment to opposing features of the component. Preferably, a slipcoat is provided on at least the sealing portion.

The structural member 1004 material is generally 68-90 Shore A durometer (A) thermoplastic (TPV), typically, 70-86 A TPV, preferably, 75-82 A TPV, most preferably, 80 A TPV. The sealing portion 1002 is generally at least 40 A TPV, typically, at least 60 A TPV, preferably, 60-68 A TPV, most preferably 67 A TPV. Any other suitable materials and durometers are contemplated depending on the particular application without departing from the scope of the present invention.

FIG. 22 illustrates an extruded seal shown generally at 1100, according to an embodiment of the present invention, that is a vent head gasket bulb seal. At least one sealing portion shown generally at 1102 and at least one structural member shown generally at 1104 is provided. The sealing portion 1102 has a plurality of apertures 1106 forming a honeycomb configuration. The structural member 1104 has no apertures 1106. The structural member 1104 is suitable for attachment to predetermined component(s) of a vehicle. The structural member 1104 includes a winged clip portion 1108. Preferably, an outer layer 1102b is provided on the outer circumference of the sealing portion 1102.

A plurality of materials are typically used. In a preferred embodiment, the sealing portion 1102 is polypropylene, the outer layer 1102b is TPV, and/or the structural member 1104 is TPV. The sealing portion 1002 material is generally 20-60 Shore A durometer (A) TPV, typically, 25-50 A TPV, preferably, 30-40 TPV, most preferably, 35 A TPV. The structural member 1104 material is generally 60-95 A TPV typically, 75-90 A TPV, preferably, 80-90 A TPV, most preferably, 87 A TPV. Any other suitable materials and durometers are contemplated depending on the particular application without departing from the scope of the present invention.

FIG. 23 illustrates an extruded seal shown generally at 1200, according to an embodiment of the present invention, that is a flex seal. At least one sealing portion shown generally at 1202 and at least one structural member shown generally at 1204 is provided. The sealing portion 1202 has a plurality of apertures 1206,1206a forming a honeycomb structure. The structural member 1204 is suitable for attachment to predetermined component(s) of a vehicle. The structural member 1204 has no apertures 1202. Preferably, at least one pressure sensitive adhesive (PSA) tape shown generally at 1210 is provided for attaching to the vehicle. Preferably, a slipcoat is applied to at least the sealing portion 1202. Preferably, an adhesive promoter is applied to the bottom surface 1212 of the structural member 1204 adjacent the PSA tape 1210.

A plurality of materials are typically used. In a preferred embodiment, the sealing portion 1202 material is generally 20-60 Shore A durometer (A) TPV, typically, 25-50 A TPV, preferably, 40-50 TPV, most preferably, 45 A TPV. The structural member 1204 material is generally 60-95 A TPV typically, 75-90 A TPV, preferably, 80-90 A TPV, most preferably, 85 A TPV. Any other suitable materials and durometers are contemplated depending on the particular application without departing from the scope of the present invention.

FIG. 24 illustrates an extruded seal shown generally at 1300, according to an embodiment of the present invention forming a generally square-like shape. At least one sealing portion shown generally at 1302 is provided. The sealing portion 1302 has a plurality of apertures 1306 forming a honeycomb structure. Preferably, at least one tape, e.g., TESA™ 4965 tape, shown generally at 1310 is provided. Preferably, an adhesive promoter indicated generally at 1312 is applied to the bottom surface of the structural member 1304 adjacent the TESA tape 1310. Preferably, a flock sheet shown generally at 1314 is operably applied to at least the sealing portion 1302, e.g., operably applied to the top surface of the sealing portion 1302. A central opening 1316 is provided, preferably, having a square cross section. Alternatively, there is no central opening 1316.

In a preferred embodiment, the sealing portion 1302 material is generally 20-60 Shore A durometer (A) TPV, typically, 25-50 A TPV, preferably, 30-40 TPV, most preferably, 35 A TPV. Any other suitable materials and durometers are contemplated depending on the particular application without departing from the scope of the present invention. Optionally, a structural member, preferably of higher durometer, is additionally provided.

Figure 25:
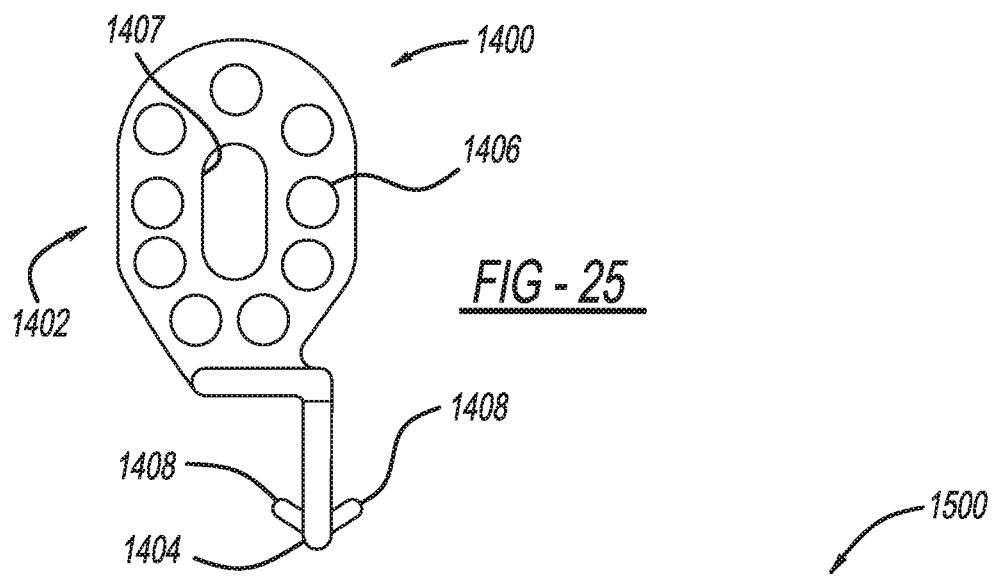
FIG. 25 is a front elevation view of an extruded seal, according to an embodiment of the present invention.

FIG. 25 illustrates an extruded seal shown generally at 1400, according to an embodiment of the present invention, that is a bulb seal. At least one sealing portion shown generally at 1402 and at least one structural member shown generally at 1404 is provided. The sealing portion 1402 has a plurality of apertures 1406 forming a honeycomb configuration. The structural member 1404 has no apertures 1406. The structural member 1404 is suitable for attachment to predetermined component(s) of a vehicle. At least one barb 1408, preferably a plurality of barbs 1408, is also provided on the at least the structural member 1404 for attachment to opposing features of the component. Preferably, a slipcoat is applied to at least the sealing portion 1402.

A plurality of materials are generally used. The sealing portion 1402 is preferably polypropylene and the structural member 1404 is preferably TPV.

Figure 32:
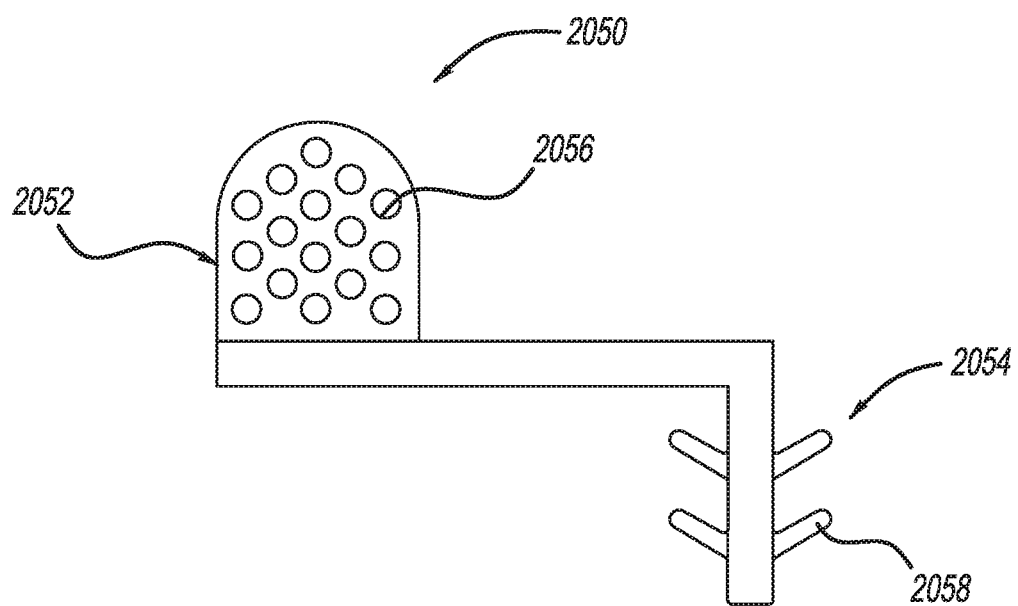
FIG. 32 is a front elevation view of an extruded seal, according to an embodiment of the present invention

FIG. 32 illustrates an extruded seal shown generally at 2050, according to an embodiment of the present invention, that includes a micro hole bulb seal. At least one sealing portion shown generally at 2052 and at least one structural member shown generally at 2054 is provided. The sealing portion 2052 has a plurality of apertures 2056 forming a honeycomb configuration, e.g., substantially aligned circularly. The structural member 2054 has no apertures 2056. The structural member 2054 has no apertures 2056. The structural member 2054 has at least one barb 2058, preferably a plurality of barbs. The structural member 2054 is suitable for attachment to predetermined component(s) of a vehicle.

Typically, the extruded seal 2050 is formed of at least two materials. Preferably, one material is a polypropylene. Preferably, the other material is a thermoplastic vulcanizate (TPV). The TPV is generally 20-60 Shore A durometer ("A") typically, 30-50 A, preferably, 30-40 A, most preferably, 35 A. Any other suitable materials and durometers are contemplated depending on the particular application without departing from the scope of the present invention.

Referring generally to FIGS. 1-7, 21-25 and 32, at least one extruded material is provided for forming the extruded seals. Typically, at least one first extruded material forms the sealing portion and at least one second extruded material forms the structural member. Preferably, a first extruded material is provided forming the sealing portion and a second extruded material, e.g., having a higher durometer than the first material, forms the structural member. Preferably, the at least one second material(s) has/have a higher durometer than the at least one first material(s).

Depending on the application the extruded materials are generally polypropylene (PP), medium density polyethylene (MDPE), thermoplastic vulcanizates (TPV), or other material suitable for making the extruded seal incorporating a honeycomb structure. If more than one extruded material is used the extruded materials are compatible materials to melt bond to one another under pressure or otherwise bond together. Typically, the sealing portions are TPV, preferably, about 35 Shore A TPV to 67 Shore A TPV or more, most preferably, 35 A TPV to 67 A TPV. Typically, the structural members are polypropylene, TPV or any other suitable material for providing a carrier, preferably, at least 67 A TPV, most preferably 67 A.

The extruded seal of the present invention is a bulbous seal, dual-bulb seal, door belt, micro hole bulb, door seal, window seal, flex seal, gasket, gasket bulb, glazing seal, anything being sealed by traditional TPV and EPDM seals, or any other extruded seal or extruded automotive seal— with or without at least one structural member, flange, retention barb, or any other secondary portion(s), and combinations thereof.

Referring to the figures generally, all the seals can include slip coats, specialty coatings and/or flock, e.g., tape or otherwise, depending on the particular applications without departing from the scope of the present invention. By non-limiting example, low friction coatings, etc.

Any other shapes, sizes and configurations of the extruded seal components and apertures, and combinations thereof, are contemplated without departing from the scope of the present invention.

Referring to FIGS. 8A-20B and 26-31B generally, in accordance with another embodiment of the present invention, there is provided a process for making extruded seals for attachment to vehicles. There is provided at least one extrusion tool assembly including an extrusion tool with at least two plates connected together and operably mounted to at least one extruder for extruding the material set forth previously. The plates are stacked together and doweled with at least one dowel and/or fastener (e.g., such as a plurality of dowels or bolts 849 or other fasteners). The plates are either fastened together, preferably, bolted, to an extruder head and other material is brought in from the side via a medium conduit (e.g., pipe) or the plates are simply attached to the extruder from the side via a pipe. In general, the extrusion tool has multiple vented pins nested in a way that allows for the material to flow around the pins producing a honeycomb shaped part. Some variations are multiple sized holes within the same profile, or varying sizes spread across different tools and different substrates. When the material is extruded through the plates, the shape of a profiled opening provided on at least one of the plates forms the profile of the extruded sealing portion and structural member, while the vented pins form the honeycomb structure in at least the sealing portion.

In general, the vented pins are small multiple vented pins that are either grouped together tightly or not, depending on the particular application. These pins are provided in predetermined configurations dependant on the application.

The pins are preferably ported to ambient air. Alternatively, the pins are operably connected to a forced air conduit to achieve a desired shape. Preferably, the pins are hardened steel and are welded into place (or other suitable method for attachment to the metal plate), most preferably, welded to the first plate to extend from the center of the outward surface of the first plate. Typically, pins are provided which serve as mandrels for molten material, e.g., TPV, to flow around the pins.

Varying the pin nest layout varies the honeycomb produced. There are several variations based on the size and shape and desired performance. Several examples are illustrated of different shapes (e.g., in FIGS. 1-2, 3B-7, 21-25 and 32) and the respective tools used to create them (e.g., in FIGS. 8A-20B and 26-31B). Different pin nesting configurations are contemplated without departing from the scope of the present invention. Pin configuration and honeycomb profile depends on desired performance requirements, e.g., softness, flexibility and compression.

There are multiple pin sizes and extruded part aperture sizes (or "holes"). In one embodiment, if the apertures are applied (e.g., with the extrusion of the sealing portion) after the structural member has been extruded, the ratio is about 1:1 (pin dimension:hole dimension). If the apertures are provided at the same time as the structural member (or there is no rigid or structural member), the ratio is 2:1 (2 millimeter (mm) pin makes 1 mm hole), but can be drawn down as much as 4:1. Alternative ratios are contemplated without departing from the scope of the present invention.

Other factors besides pin configuration and pin outer diameter that contribute to the diameter of the honeycomb holes include, the level of forced air.

Preferably, the method is performed with in-line processing steps, upstream to downstream, arranged generally along the longitudinal axis with pulled material moving in a forward direction toward a cutting device that cuts the extrusion to predetermined length. Depending on the particular applications, cooling, such as by at least one cooling tank, etc, and calibration, such as by at least one vacuum calibrator, etc. are performed prior to cutting. Using more than one extrusion tool device for extruding the extruded seal is contemplated depending on the application without departure from the scope of the present invention.

Referring more particularly to FIGS. 8A-10 and 13, according to an embodiment of the present invention, an extrusion tool shown generally at 718 is provided having least one first plate 720 and at least one second plate 722. A plurality of pins shown generally at 724 are provided and welded to the first plate 720 in a generally circular central packed space forming a pin configuration indicated generally at 724a. The pins 724 are preferably ported to ambient air. Alternatively, the pins 724 are operably connected to a forced air conduit to achieve a desired shape.

The second plate 722 has at least one opening shown generally at 726. The opening 726 includes at least one first portion 728 to shape the at least one sealing portion of the extruded seal and at least one second portion 730 to form the shape of the at least one structural member of the extruded seal. Preferably, the first plate 800 has a corresponding second portion 730a aligned with second portion 730 of the second plate 722. There are no pins 724 in the aligned structural portions 730,730a. When the plates are connected together (FIG. 13), the pins 724 nest into the first portion 728 of the opening 726. The pins 724 serve as mandrels for molten material to flow around the pins 724 as the material passes through the opening 726 in forming the sealing portion with apertures. Extruding a first material through the opening 726 forming the at least one sealing portion is either before or after the at least one structural member has been extruded extrusion with a material (either the same or a different material as the first material). Alternatively, the material(s) are co-extruded. FIGS. 8A-10 and 13 illustrate the first plate 720 and second plate 722 of the extrusion tool assembly for manufacturing the extruded seal of FIG. 6.

Referring more particularly to FIGS. 11-12, 14-20B and 26-31B, these are similar to FIGS. 8A-10 and 13, however, there are provided first and second plates with various pin configurations and profiled openings to form other extruded seal profiles and honeycomb structures, in accordance with other embodiments of the present invention.

Figure 11:
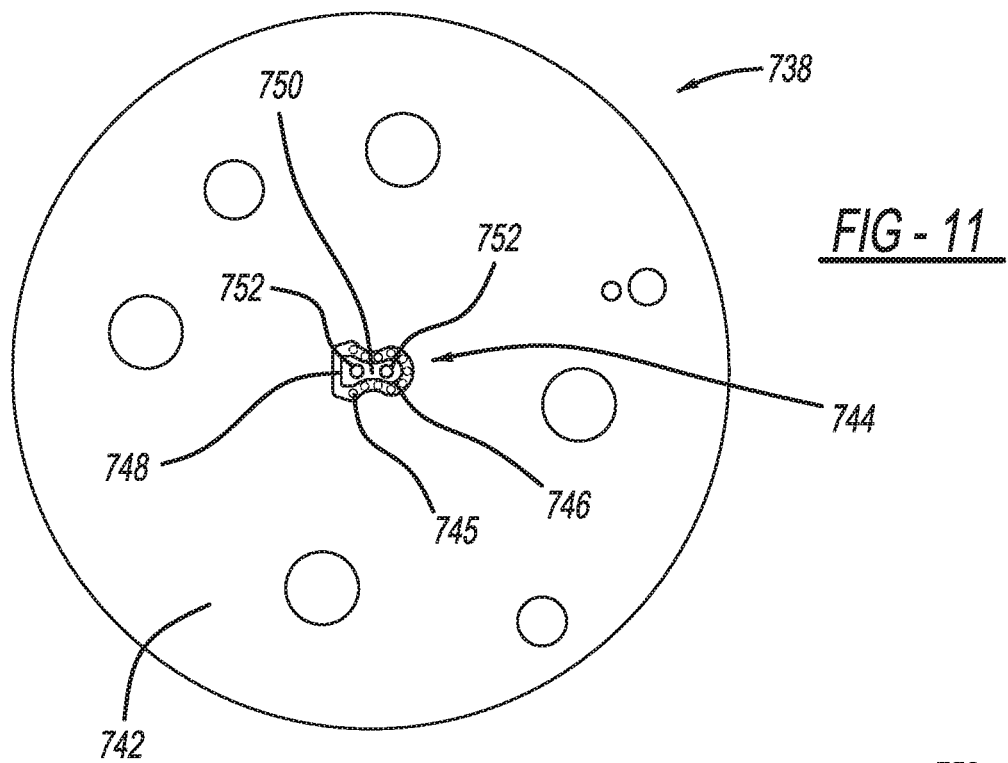
FIG. 11 is a top plan view of stacked first plate and second plates of the extrusion tool assembly for manufacturing the extruded seal of FIGS. 3C-3D, in accordance with another embodiment of the present invention.

FIG. 11 illustrates an extrusion tool shown generally at 738 including at least one first plate and at least one second plate 742 stacked together and having a pin configuration, shown generally at 744, with a plurality of pins 745 within a profiled opening 746, and no pins within at least one pin less segment 748. At least one insert portion 750 or block is connected to the first plate. This insert portion 750 allows the central gap or opening, where there is no material, in the extruded seal of FIGS. 3C-3D. When the first and second plates are connected together, the pins 744 and insert portion 750 of the first plate extend into the opening 746 of the second plate 742 for manufacturing the extruded seal of FIGS. 3C-3D. Preferably, the insert portion 750 is a larger profiled piece with at least one venting aperture 752.

Figure 12:
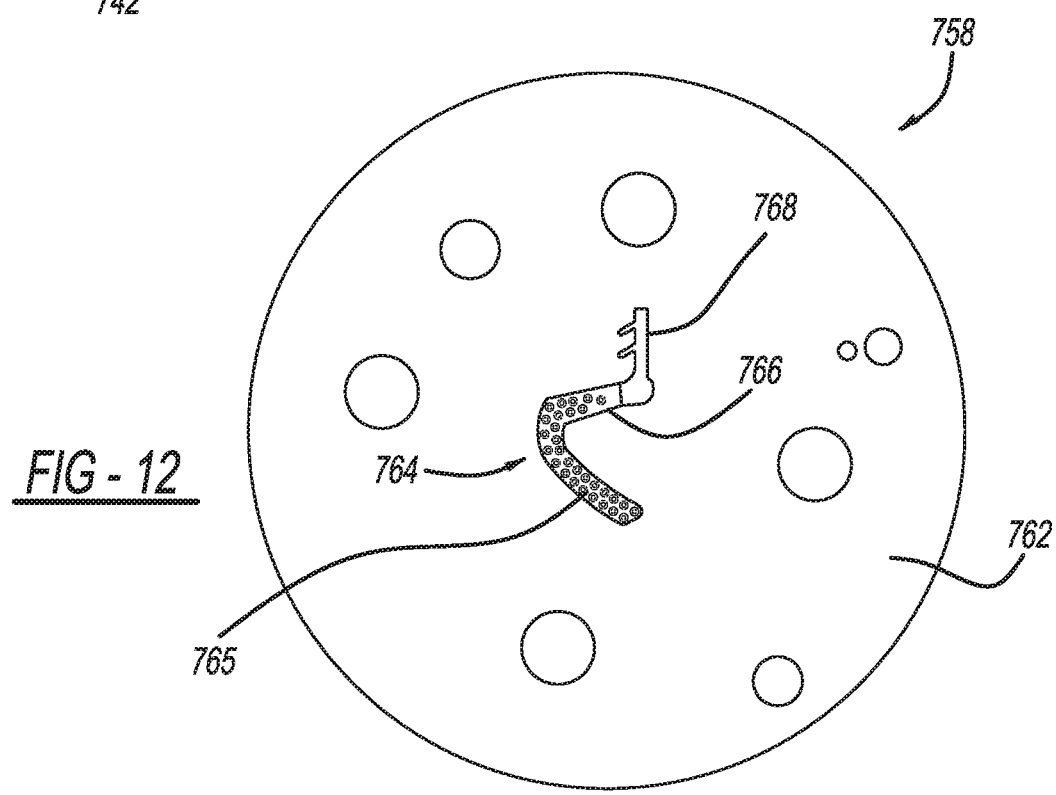
FIG. 12 is a top plan view of stacked first plate and second plates of the extrusion tool assembly for manufacturing the extruded seal of FIG. 5, in accordance with another embodiment of the present invention.
Figure 13:
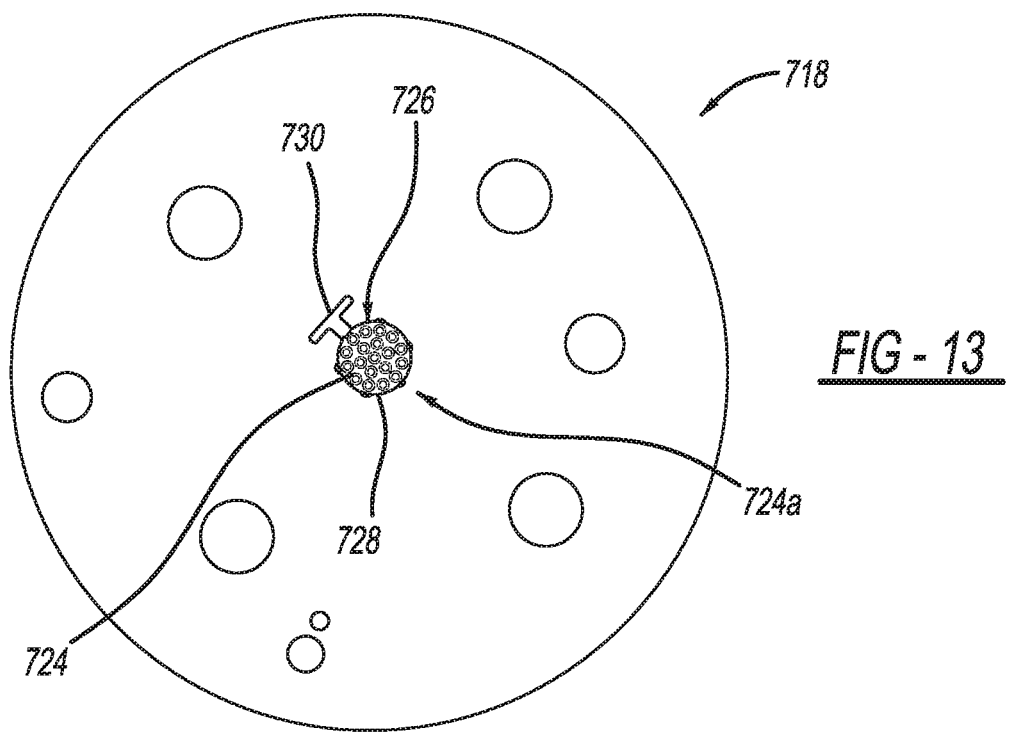
FIG. 13 is a top plan view of the plates of FIG. 9 stacked for manufacturing the extruded seal of FIG. 6, in accordance with another embodiment of the present invention.

FIG. 12 an extrusion tool shown generally at 758 including at least one first plate and at least one second plate 762 stacked together and having a pin configuration, shown generally at 764, with a plurality of pins 765 of the first plate within a profiled opening 766 for manufacturing the extruded seal of FIG. 5. No pins are within the structural member forming portion 768 of opening 766.

Figure 14:
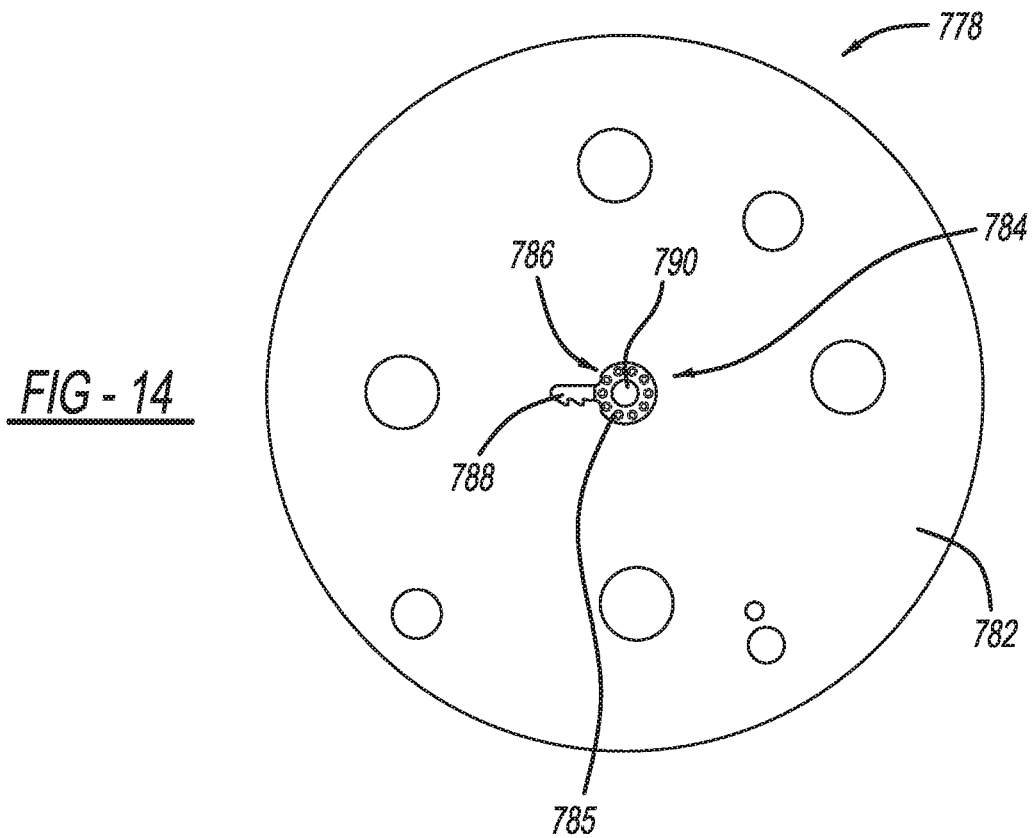
FIGS. 14-15 are top plan views of stacked first plate and second plates of the extrusion tool assembly for manufacturing the extruded seal of FIG. 4, in accordance with another embodiment of the present invention.
Figure 15:
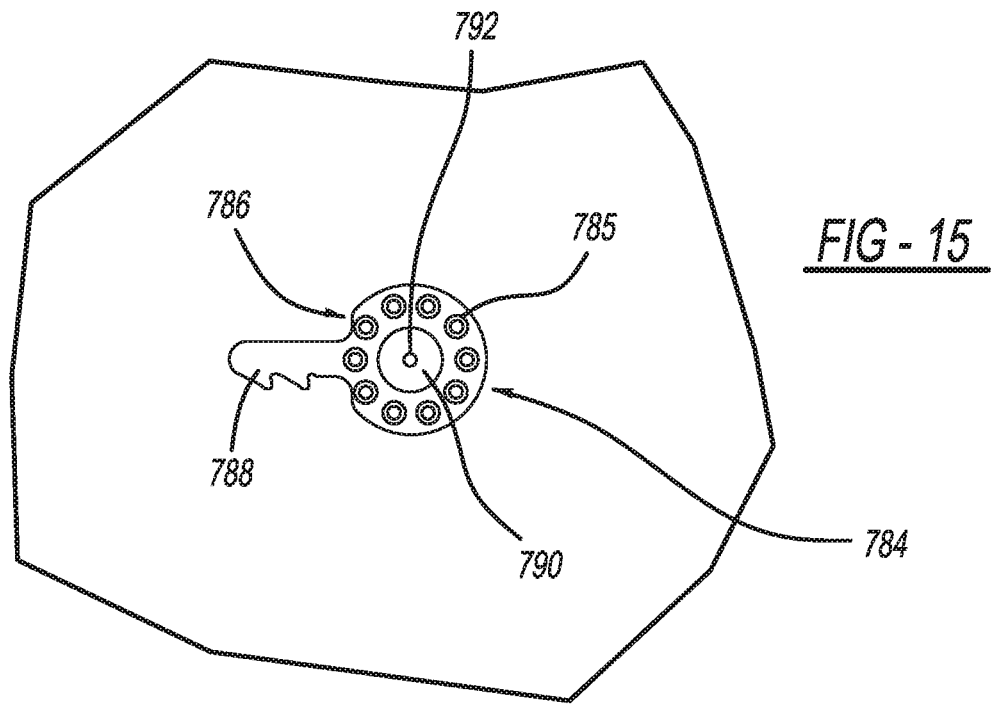

FIGS. 14-15 illustrate an extrusion tool shown generally at 778 including at least one first plate and at least one second plate 782 stacked together and having a pin configuration, shown generally at 784, with a plurality of pins 785 within a profiled opening shown generally at 786, and no pins 911 within at least one pin less segment 788 of the opening. At least one insert portion 790 is connected to the first plate. This insert portion 790 allows the central gap or opening, where there is no material, in the extruded seal of FIG. 4. When the first and second plates are connected together, the pins 785 and insert portion 790 of the first plate extend into the opening 786 of the second plate 782 for manufacturing the extruded seal of FIG. 4. Preferably, the insert portion 790 is a larger pin diameter with a venting aperture 792.

Figure 16:
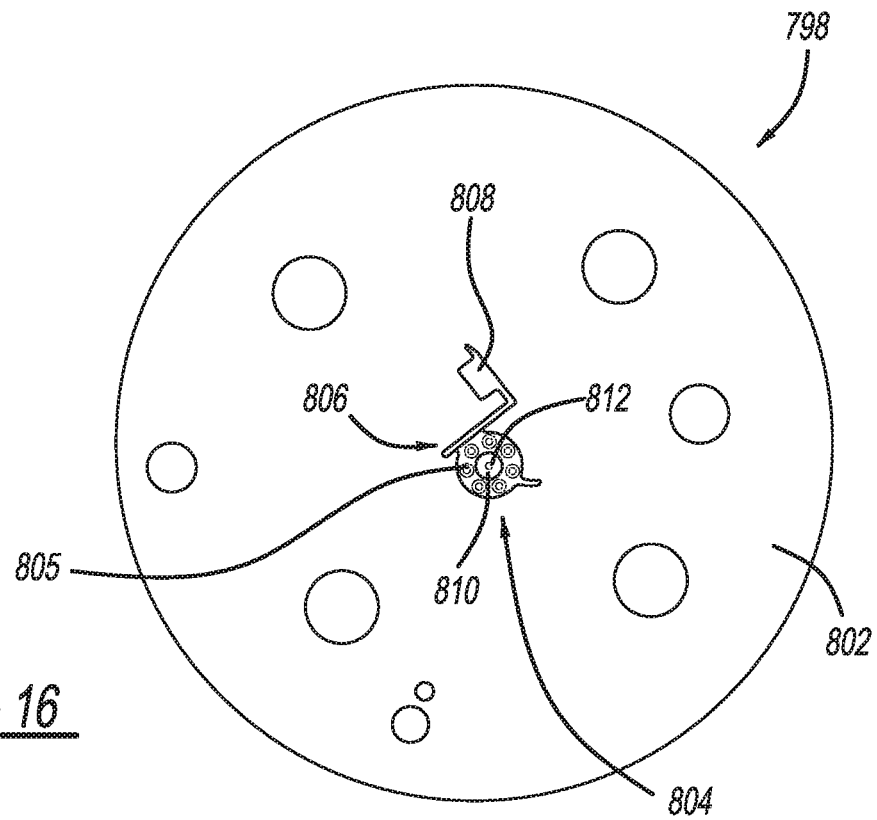
FIGS. 16-17 are top plan views of stacked first plate and second plates of the extrusion tool assembly for manufacturing extruded seals, in accordance with another embodiment of the present invention.
Figure 17:
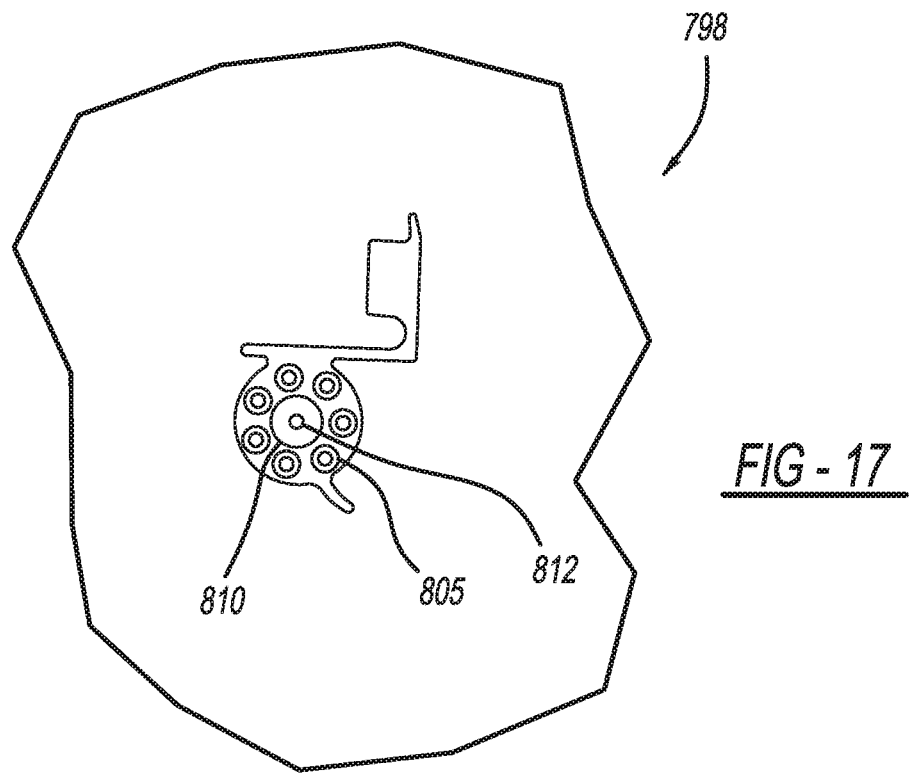

FIGS. 16 and 17 illustrate an extrusion tool shown generally at 798 including at least one first plate and at least one second plate 802 stacked together and having a pin configuration, shown generally at 804, with a plurality of pins 805 mounted on the first plate and located within a profiled opening shown generally at 806 when the plates are stacked. There are no pins within at least one pin less segment 808 of the opening. At least one insert portion 810 is also mounted to the first plate. This insert portion 810 allows the central gap or opening, where there is no material, in the extruded seal of FIG. 1. When the first and second plates are connected together, the pins 805 and insert portion 810 of the first plate extend into the opening 806 of the second plate 782 for manufacturing the extruded seal of FIG. 1. Preferably, the insert portion 810 is a larger pin diameter with a venting aperture 812.

Figure 18A:
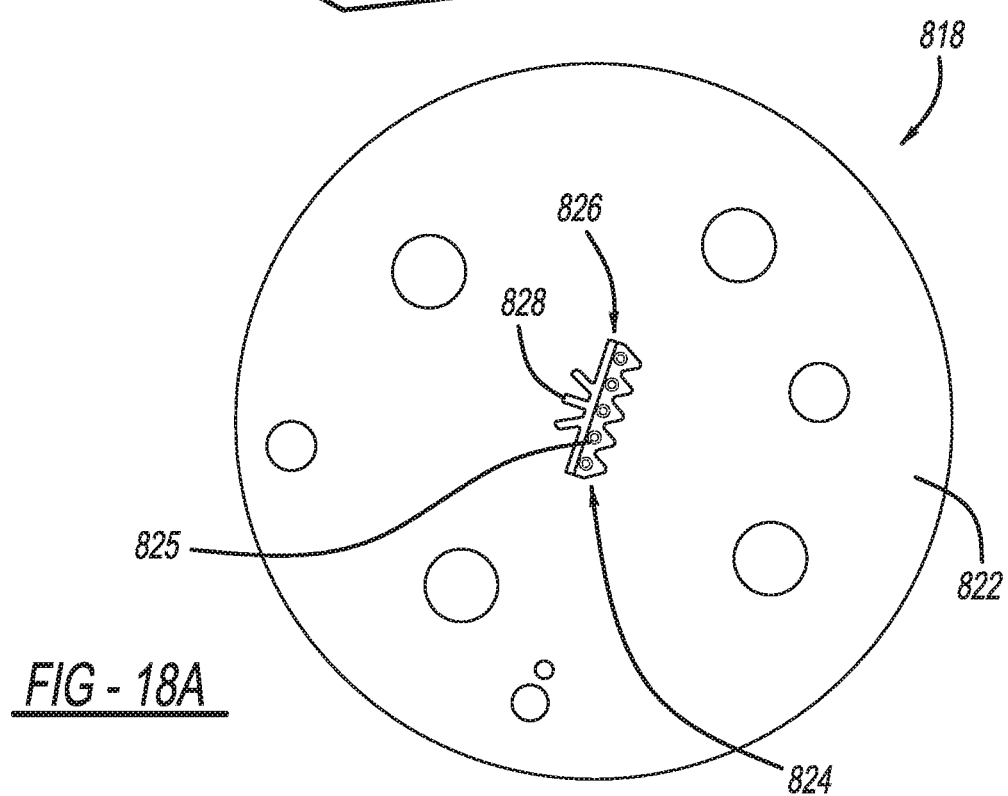
FIGS. 18A-18B are top plan views of stacked first plate and second plates of the extrusion tool assembly for manufacturing the extruded seal of FIG. 2, in accordance with another embodiment of the present invention.
Figure 18B:
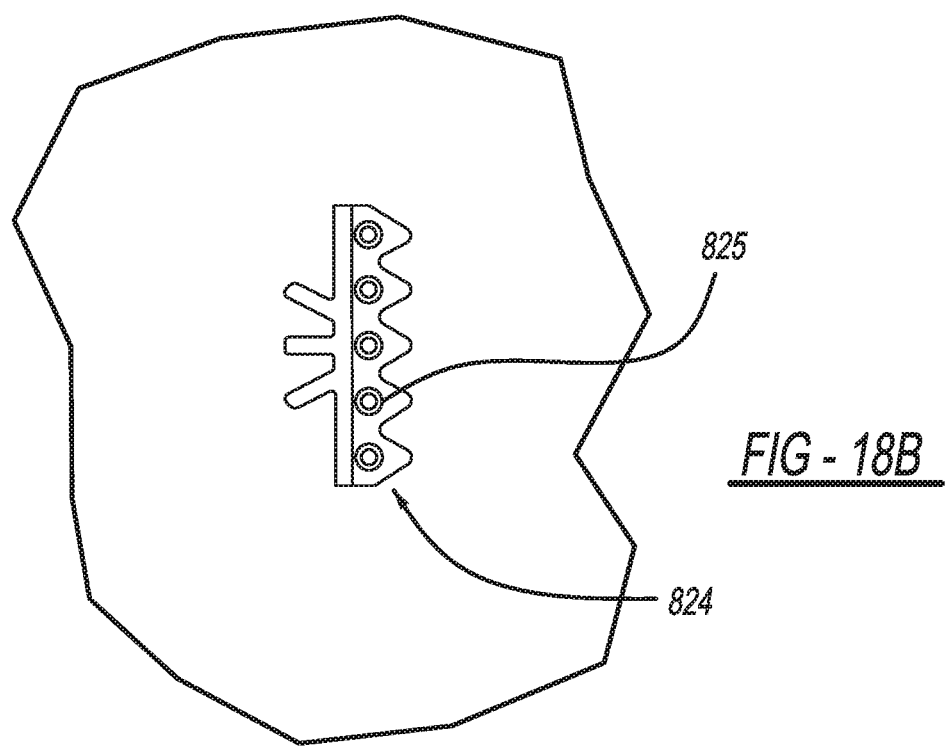

FIGS. 18A-18B illustrate an extrusion tool shown generally at 818 including at least one first plate and at least one second plate 822 stacked together and having a pin configuration, shown generally at 824, with a plurality of pins 825 within a profiled opening shown generally at 826, and no pins within at least one pin less segment 828 of the opening, for manufacturing the extruded seal of FIG. 2. When the first and second plates 822 are connected together, the pins 825 mounted on the first plate extend into the opening 826 of the second plate 822 for manufacturing the extruded seal of FIG. 2.

Figure 19:
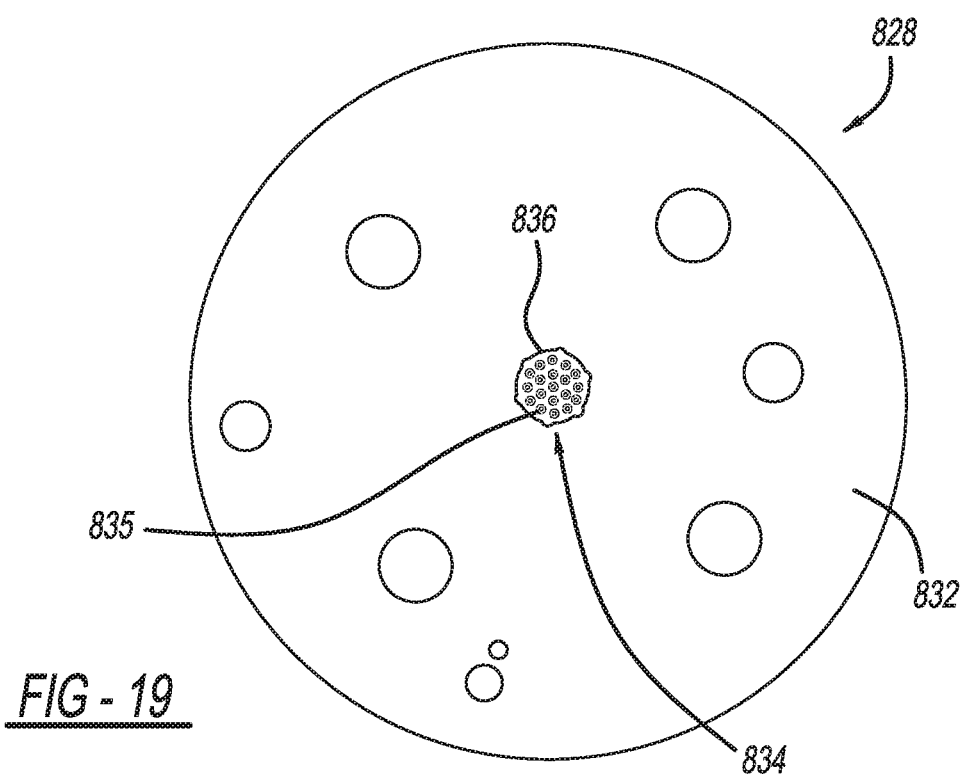
FIG. 19 is a top plan view of stacked first plate and second plates of the extrusion tool assembly for manufacturing extruded seals, in accordance with another embodiment of the present invention.

FIG. 19 illustrates an extrusion tool shown generally at 828 including at least one first plate and at least one second plate 832 stacked together and having a pin configuration, shown generally at 834, with a plurality of pins 835 mounted to the first plate and located within a profiled opening 836 when the plates are stacked to form an extruded seal with a honeycomb structure.

Figure 20:
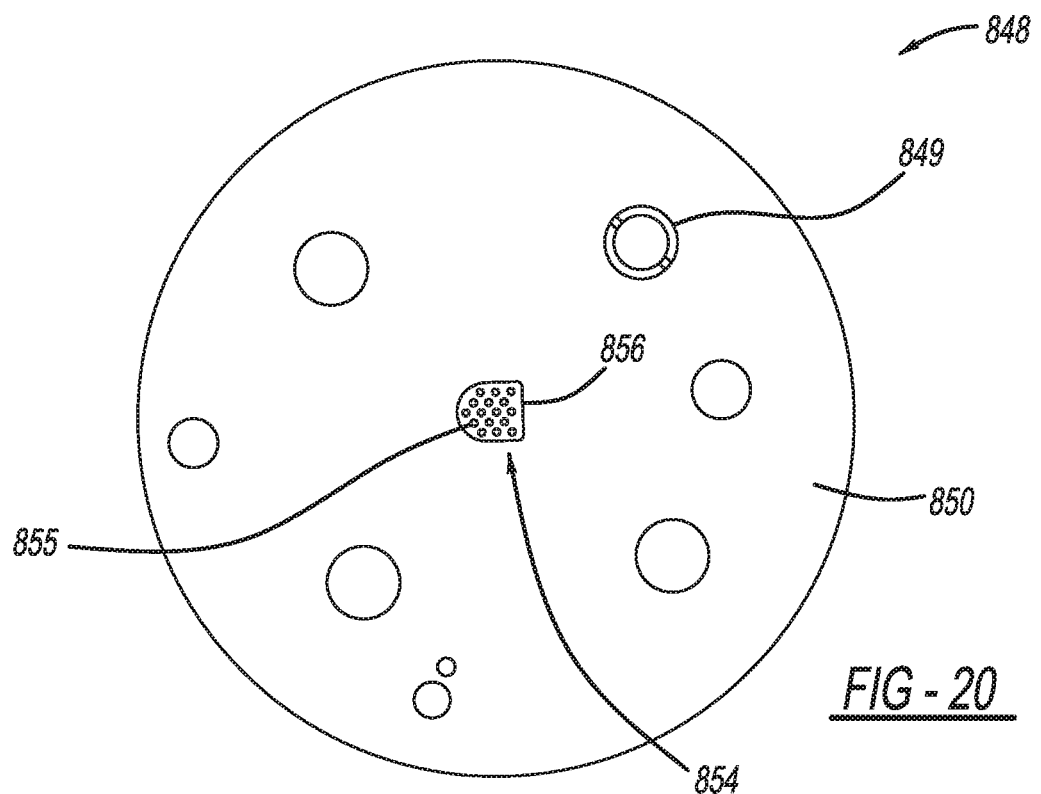
FIG. 20 is a top plan view of stacked first plate and second plates of the extrusion tool assembly for manufacturing the extruded seal of FIG. 7, in accordance with another embodiment of the present invention.

FIG. 20 illustrates an extrusion tool shown generally at 848 including at least one first plate and at least one second plate 850 stacked together (e.g., with at least one dowel 849 or bolt or other fastener) and having a pin configuration, shown generally at 854, with a plurality of pins 855 within a profiled opening 856 for manufacturing the extruded seal of FIG. 7. When the first and second plates 850 are connected together, the pins 850 mounted on the first plate extend into the opening 856 of the second plate 850 for manufacturing the extruded seal of FIG. 7.

Figure 26:
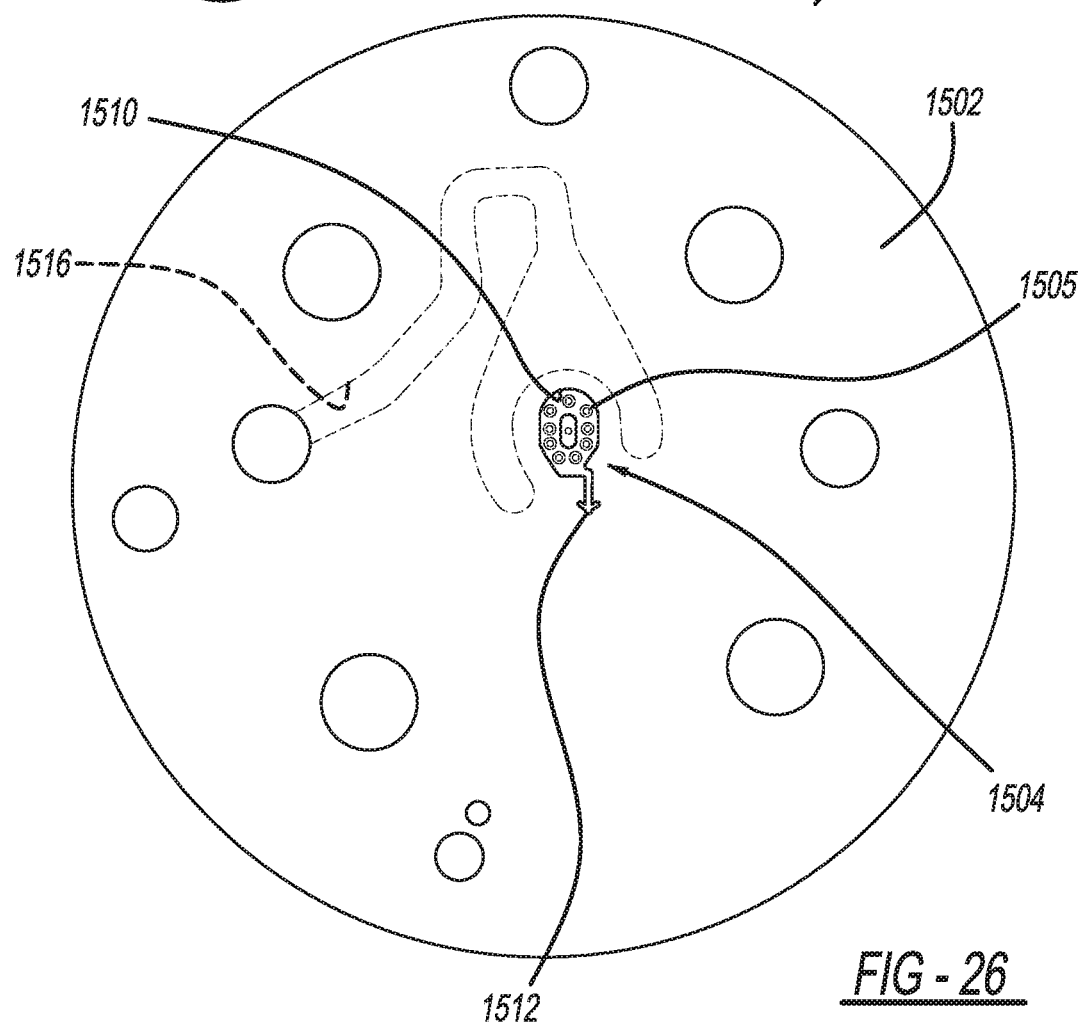
FIG. 26 is a top plan view of a first plate of an extrusion tool assembly for manufacturing the extruded seal of FIG. 25, in accordance with another embodiment of the present invention.

FIG. 26 illustrates an extrusion tool shown generally at 1500 including at least one first plate and at least one second plate 1502 stacked together and having a pin configuration, shown generally at 1504, with a plurality of pins 1505 within a profiled opening 1510, and no pins within at least one pin less segment 1512. At least one insert portion 1514 is connected to the first plate. This insert portion 1514 allows the central gap or opening 1407 (e.g., obround shaped opening), where there is no material, in the extruded seal of FIG. 25. At least one channel 1516 or pocket is preferably formed in at least the first plate of a predetermined depth. When the first and second plates are connected together, the pins 1505 and insert portion 1514 of the first plate extend into the opening 1510 of the second plate 1502 for manufacturing the extruded seal of FIG. 25. Preferably, the insert portion 1514 is a larger profiled piece with at least one venting aperture than the plurality of smaller vented pins 1505.

Figure 27:
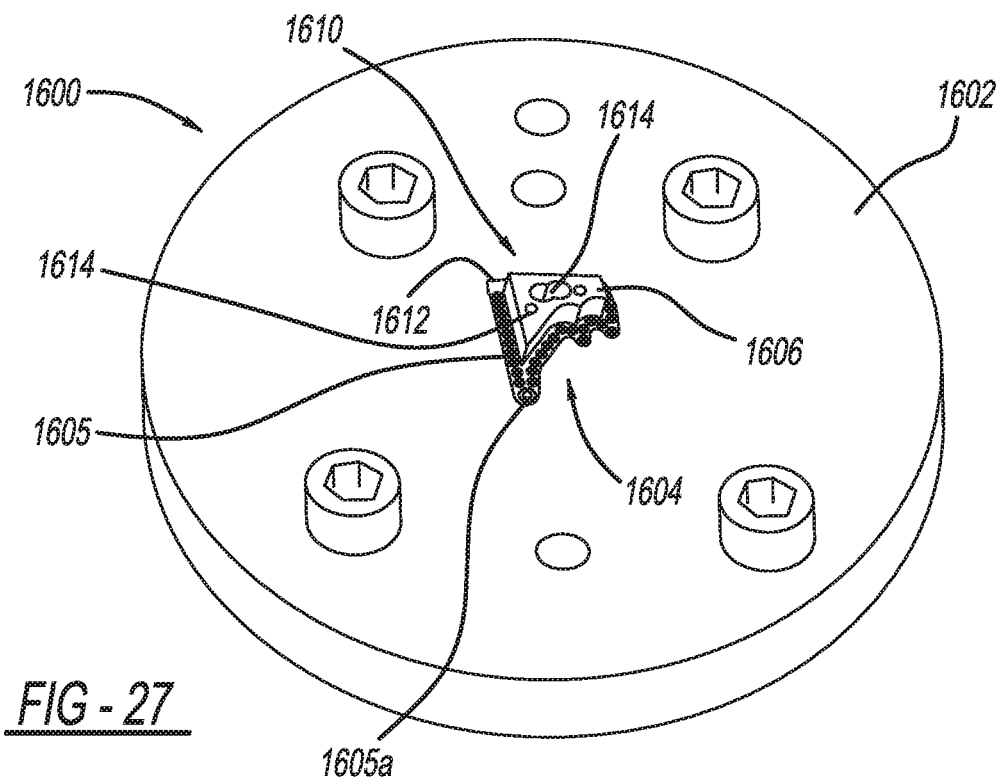
FIG. 27 is a perspective view of stacked first and second plates of the extrusion tool assembly for manufacturing the extruded seal of FIG. 23, in accordance with another embodiment of the present invention.

FIG. 27 illustrates an extrusion tool shown generally at 1600 including at least one first plate and at least one second plate 1602 stacked together and having a pin configuration, shown generally at 1604, with a plurality of pins 1605 and 1605a within a profiled opening 1610, and no pins within at least one pin less segment 1612. At least one pin 1605a is a larger diameter pin to create a larger hole 1206a in the honeycomb structure. At least one insert portion 1606 is connected to the first plate. This insert portion 1606 allows the central gap or opening 1211, where there is no material, in the extruded seal of FIG. 23. The insert portion 1606 is also vented by a plurality of apertures 1614. When the first and second plates are connected together, the pins 1605, 1605a and insert portion 1606 of the first plate extend into the opening 1610 of the second plate 1602 for manufacturing the extruded seal of FIG. 23. The insert portion 1606 extends above the opening 1610. Alternatively, the insert portion 1606 is captured within the opening 1610 substantially flush with the top of the opening in the second plate 1602.

Figure 28:
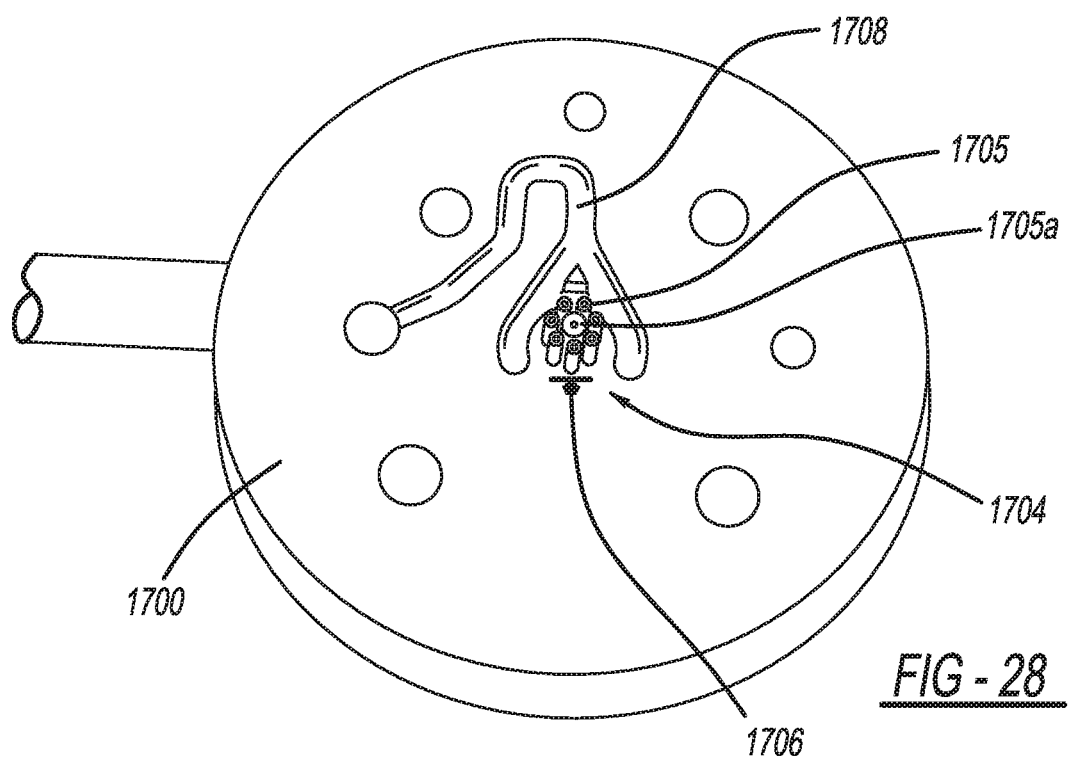
FIG. 28 is a top plan view of first plate of the extrusion tool assembly for manufacturing the extruded seal of FIG. 22, in accordance with another embodiment of the present invention.

FIG. 28 illustrates a first plate 1700 for stacking to a second plate to form an extrusion tool. A plurality of pins 1705,1705a are mounted to the first plate 1700 to form a pin configuration, shown generally at 1704. At least one pin 1705a is a larger diameter pin to create a larger hole in the honeycomb structure, such as the central opening 1110 in the extruded seal of FIG. 22. A pin less segment 1706 forms the structural member of FIG. 22. At least one channel 1708 or pocket is preferably formed in at least the first plate 1700. The first plate 1700 is stackable with a second plate having at least one opening for receiving the pins and corresponding area of no pins. When the first 1700 and second plates are connected together, the pins 1705,1705a of the first plate extend into part of the opening of the second plate for manufacturing the extruded seal of FIG. 22. An outer layer 1102b (slip coat, etc) can also be provided on the outer circumference of the sealing portion 1102 of the seal 1100.

Figure 29:
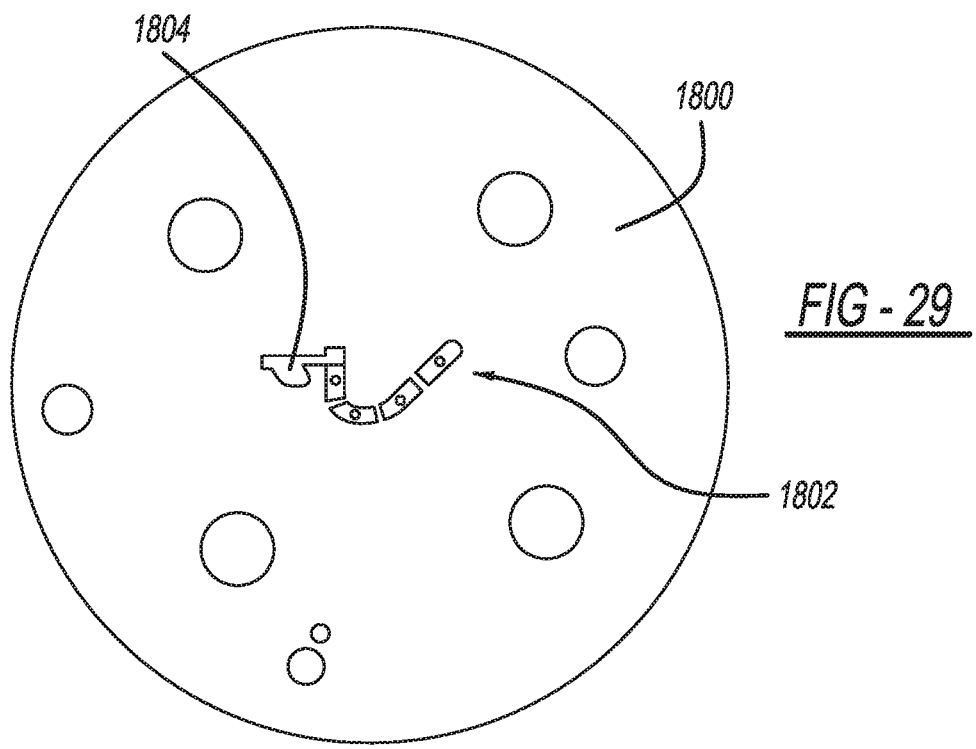
FIG. 29 is a top plan view of first plate of the extrusion tool assembly for manufacturing an extruded seal, in accordance with another embodiment of the present invention.

FIG. 29 illustrates a first plate 1800 having a pin configuration, shown generally at 1802 and profiled opening 1804 with no pins, stackable with a second plate having at least one opening for receiving the pins and corresponding area of no pins, for manufacturing an extruded seal with a honeycomb structure. In this embodiment the pins 1804 are each generally rectangular and vented as previously described.

Figure 30:
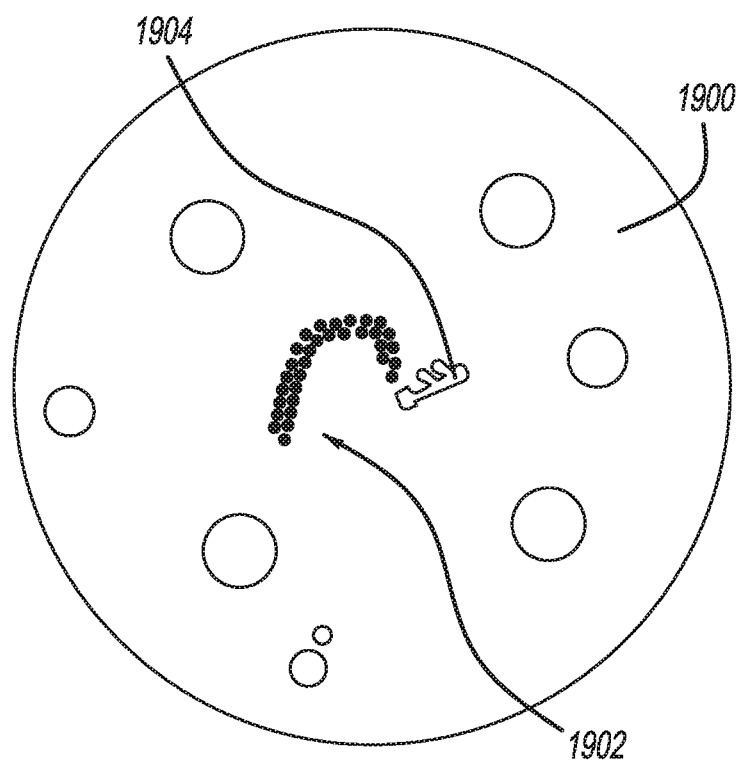
FIG. 30 is a top plan view of a first plate of the extrusion tool assembly for manufacturing the extruded seal of FIG. 21, in accordance with another embodiment of the present invention.

FIG. 30 illustrates a first plate 1900 having a pin configuration, shown generally at 1902 and profiled opening 1904 with no pins, stackable with a second plate having at least one opening for receiving the pins and corresponding area of no pins, for manufacturing the extruded seal of FIG. 21.

Figure 31B:
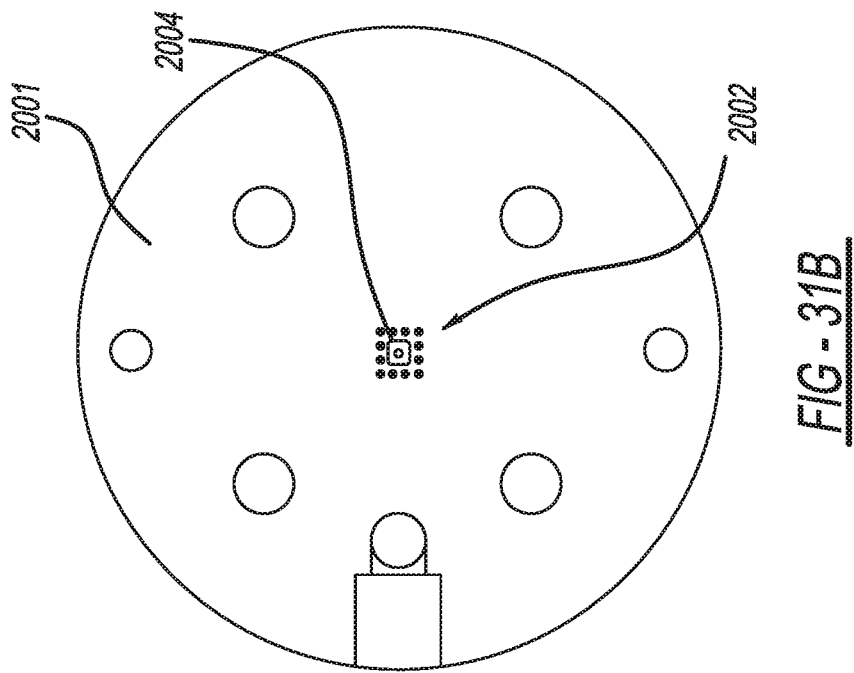
FIGS. 31A-B are a top plan views of first and second plates of the extrusion tool assembly for manufacturing the extruded seal of FIG. 24, in accordance with another embodiment of the present invention.
Figure 31A:
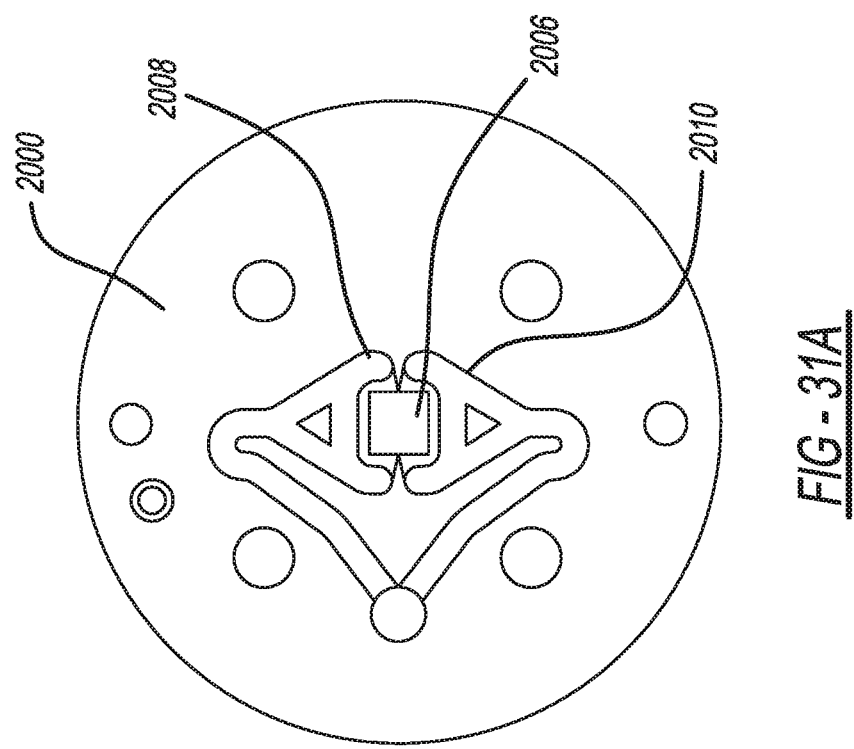

FIGS. 31A-31B illustrate a first plate 2001 having holes provided corresponding to a pin configuration, shown generally at 2002 for manufacturing the honeycomb structure of the extruded seal of FIG. 24. Drill blanks are inserted and welded on the back. Then a vent hole through, e.g., about 0.5 mm vent hole. A darn 2006 and packets 2008,2010 are also provided on the back plate 2000.

FIG. 32 depicts an extruded seal shown generally at 2050, according to another embodiment of the present invention, with a sealing portion shown generally at 2052 including a honeycomb structure with a plurality of apertures 2056, and a structural member shown generally at 2054 with at least one barb 2058.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. An elongated extruded bulb seal for providing sealing against a vehicle surface, comprising:
    a compressible bulbous sealing portion having a thickness which is operable to abut against a surface for sealing of air or water, said bulbous sealing portion having an outermost wall defining at least one large opening which is surrounded by said outermost wall circumscribing the opening, said outermost wall comprising a closed cell non-foamed structure with a plurality of smaller continuous apertures which circumferentially surround said at least one large opening and which are symmetrically around the at least one larger opening located through said outermost wall of said elongated extruded bulb seal within the thickness of the compressible bulbous sealing portion for providing a compressible sealing member having a substantially uniform density without the use of a foam material, and said compressible bulbous sealing portion comprised of a material having a durometer of about 20-60 Shore A;
    a carrier for attaching to a part, said carrier coupled to the compressible bulbous sealing portion and having no apertures for providing an attachment portion which is operable for being attached to a vehicle surface.

2. The elongated extruded bulb seal of claim 1, wherein the plurality of apertures are substantially the same size.

3. The elongated extruded bulb of claim 1, wherein a portion of the plurality of apertures are a first width and the remaining plurality of apertures are a second width.

4. The elongated extruded bulb of claim 1, wherein the sealing portion is thermoplastic vulcanizates.

5. The elongated extruded bulb of claim 1, wherein the carrier is thermoplastic vulcanizates or polypropylene.

6. An elongated extruded bulb seal for providing sealing against a vehicle surface, comprising:
    a compressible bulbous sealing portion that is moisture resistant, said compressible bulbous sealing portion having a thickness which is operable to abut against the vehicle surface for sealing, and said compressible bulbous sealing portion having an outermost wall defining a single large opening which is surrounded by said outermost wall circumscribing the opening, said outermost wall comprising a closed cell non-foamed structure with a plurality of smaller continuous apertures with circular cross sections and which circumferentially surround said large opening and which are symmetrically around the single larger opening located through said outermost wall of said elongated extruded seal within the thickness of the compressible bulbous sealing portion for providing a compressible sealing member having a substantially uniform density without the use of a foam material, and said compressible bulbous sealing portion comprised of a material having a durometer of about 20-60 Shore A; and
    a structural member for attaching to a part, said structural member coupled to the compressible bulbous sealing portion and having no apertures for providing an attachment portion which is operable for being attached to a vehicle surface.

7. The elongated extruded bulb of claim 6, wherein the elongated extruded seal is selected from the group consisting of bulbous seal, dual-bulb seal, door belt, micro hole bulb, door seal, window seal, flex seal, gasket, gasket bulb, and glazing seal.

8. The elongated extruded bulb of claim 6, wherein the sealing portion is thermoplastic vulcanizates.

9. The elongated extruded bulb of claim 6, further comprising said structural member for mounting to the vehicle, the structural member having no honeycomb profile.

10. The elongated extruded bulb of claim 9, wherein the structural member further comprises a plurality of barbs for connecting to the vehicle.

11. The elongated extruded bulb of claim 6, wherein the extruded seal is formed of at least one extruded material selected from the group consisting of polypropylene, medium density polyethylene, ethylene propylene diene monomer, thermoplastic vulcanizates and combinations thereof.

12. A method for making an elongated extruded bulb seal for providing sealing against a vehicle surface, comprising:
    providing a plurality of pins that are operably vented to serve as mandrels for extruded molten material to flow around the plurality of pins;
    providing a first plate, said plurality of pins operably connected to the first plate in a predetermined configuration;
    providing a second plate including a profiled opening;
    aligning the plurality of pins of the first plate into the profiled opening of the second plate and connecting the first and second plates together;
    extruding at least one molten material through the first and second plates while venting the plurality of pins to form at least a compressible bulbous sealing portion of the elongated extruded bulb seal, wherein the extruded molten material flows through the profiled opening and around the plurality of pins in forming the elongated extruded bulb seal, and, wherein the configuration and size of the plurality of pins in combination with venting the plurality of pins determines the compressible bulbous sealing portion profiles, said compressible bulbous sealing portion having a thickness which is operable to abut against a surface for sealing of air or water, said compressible bulbous sealing portion having an outermost wall defining at least one large opening which is surrounded by said outermost wall circumscribing the opening, said outermost wall comprising a closed cell non-foamed structure with a plurality of smaller continuous apertures which circumferentially surround said at least one large opening and which are symmetrically around the at least one larger opening located through said outermost wall of said elongated extruded bulb seal within the thickness of the compressible bulbous sealing portion for providing a compressible sealing member having a substantially uniform density without the use of a foam material, and said compressible bulbous sealing portion comprised of a material having a durometer of about 20-60 Shore A, and wherein extruding said at least one molten material forms a carrier of said elongated extruded bulb seal for attaching to a part, said carrier integrally formed with the compressible bulbous sealing portion and having no apertures for providing an attachment portion which is operable for being attached to a vehicle surface.

13. The method of claim 12, wherein the profile comprises the sealing portion with the plurality of smaller apertures through the longitudinal length of the compressible bulbous sealing portion of the extruded seal.

14. The method of claim 12, wherein the plurality of pins are ported to ambient air.

15. The method of claim 12, wherein the plurality of pins are operably connected to receive a predetermined level of forced air, and, wherein varying the level of forced air also changes the diameter of the plurality of smaller apertures.

16. The method of claim 12, wherein the profiled opening includes a first portion to define a predetermined outer shape of the sealing portion.

17. The method of claim 16, further comprising providing a second portion of the profiled opening to form the shape of at least one structural member of the extruded seal, said second portion having no pins, and, extruding the same molten material or a different molten material through the second portion; and the structural member comprises the carrier.

18. The method of claim 17, wherein the structural member is formed of a second material having a higher durometer than the sealing portion, and operable for attaching the extruded seal to a vehicle part.

19. The method of claim 16, wherein the sealing portion is co-extruded with the structural member.

20. The method of claim 19, wherein a ratio of pin size, of each of the plurality of pins, to a hole size formed by each pin is in a range of 2:1 to 4:1.

21. The method of claim 16, wherein the sealing portion is extruded and applied to the structural member after the structural member is formed.

22. The method of claim 21, wherein a ratio of pin size, of each of the plurality of pins, to a hole size formed by each pin is 1:1.

\* \* \* \* \*